United States Patent
Tsukino

(10) Patent No.: US 9,829,232 B2
(45) Date of Patent: Nov. 28, 2017

(54) AIR-CONDITIONING APPARATUS

(71) Applicant: Mitsubishi Electric Corporation, Tokyo (JP)

(72) Inventor: Hideki Tsukino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 214 days.

(21) Appl. No.: 14/631,954

(22) Filed: Feb. 26, 2015

(65) Prior Publication Data

US 2015/0300723 A1 Oct. 22, 2015

(30) Foreign Application Priority Data

Apr. 16, 2014 (JP) .................................. 2014-084236

(51) Int. Cl.
*F25D 21/02* (2006.01)
*F25B 49/02* (2006.01)
(Continued)

(52) U.S. Cl.
CPC ............ *F25B 49/02* (2013.01); *F25B 47/025* (2013.01); *F25B 13/00* (2013.01);
(Continued)

(58) Field of Classification Search
CPC ........ F25B 49/02; F25B 47/025; F25B 13/00; F25B 2600/01; F25B 2600/0253;
(Continued)

(56) References Cited

U.S. PATENT DOCUMENTS 4,338,790 A * 7/1982 Saunders ................ F25B 13/00
62/156
5,046,323 A * 9/1991 Kuwahara ............... F24F 3/065
62/140
(Continued)

FOREIGN PATENT DOCUMENTS

EP 2634513 A1 9/2013
JP S54-154851 A 12/1979
(Continued)

OTHER PUBLICATIONS

Extended European Search Report dated Dec. 14, 2015 in the corresponding EP application No. 15159734.1.
(Continued)

*Primary Examiner* — Kun Kai Ma
(74) *Attorney, Agent, or Firm* — Posz Law Group, PLC

(57) ABSTRACT

Provided is an air-conditioning apparatus including a plurality of indoor units for an outdoor unit, which is capable of determining whether there is occurrence of frost formation on the outdoor unit during a heating operation so as to enable a transition to a defrosting operation at an appropriate timing. Each of the indoor units is configured to transmit an operating-state notification for notifying a self-operating state to the outdoor unit. The outdoor unit is configured to determine the number of indoor units performing the heating operation among the plurality of indoor units based on the operating-state notifications, and determine the occurrence of the frost formation after elapse of a preset time period from a time at which the number of the indoor units performing the heating operation changes.

20 Claims, 17 Drawing Sheets

(51) Int. Cl.
*F25B 47/02* (2006.01)
*F25B 13/00* (2006.01)

(52) U.S. Cl.
CPC ... *F25B 2313/0233* (2013.01); *F25B 2500/19* (2013.01); *F25B 2600/01* (2013.01); *F25B 2600/0253* (2013.01); *F25B 2700/2117* (2013.01); *F25B 2700/21152* (2013.01); *Y02B 30/741* (2013.01)

(58) Field of Classification Search
CPC ........ F25B 2500/19; F25B 2700/21152; F25B 2700/2117; F25B 2313/0233
See application file for complete search history.

(56) References Cited

U.S. PATENT DOCUMENTS

| | | | | |
|---|---|---|---|---|
| 5,156,010 A | * | 10/1992 | Inoue | F25B 47/025 165/240 |
| 2005/0081540 A1 | * | 4/2005 | Hwang, II | F25B 13/00 62/175 |
| 2007/0144187 A1 | * | 6/2007 | Lee | F25B 47/025 62/155 |
| 2008/0168783 A1 | * | 7/2008 | Kojima | F24F 11/0086 62/151 |
| 2009/0266093 A1 | * | 10/2009 | Aoki | F25B 47/025 62/155 |
| 2009/0320507 A1 | * | 12/2009 | Saruwatari | F24F 11/0086 62/234 |
| 2011/0232308 A1 | * | 9/2011 | Morimoto | F25B 13/00 62/132 |
| 2013/0192284 A1 | * | 8/2013 | Kawai | F25D 21/06 62/156 |
| 2013/0227981 A1 | * | 9/2013 | Tsukino | F25B 49/02 62/222 |
| 2015/0040592 A1 | * | 2/2015 | Kimura | F25D 21/004 62/156 |
| 2015/0204592 A1 | * | 7/2015 | Iwasaki | F24F 11/006 62/156 |
| 2015/0276290 A1 | * | 10/2015 | Aoyama | F25B 13/00 62/115 |
| 2015/0292789 A1 | * | 10/2015 | Takenaka | F25B 13/00 62/140 |
| 2015/0300701 A1 | * | 10/2015 | Nakaguchi | F25B 49/005 62/140 |
| 2016/0116202 A1 | * | 4/2016 | Takenaka | F25B 13/00 62/140 |
| 2016/0169571 A1 | * | 6/2016 | Kimura | F24F 11/0086 62/155 |
| 2016/0178259 A1 | * | 6/2016 | Kimura | F25B 25/005 62/155 |
| 2016/0178261 A1 | * | 6/2016 | Kimura | F25B 13/00 62/155 |
| 2016/0223236 A1 | * | 8/2016 | Kimura | F24F 3/065 |
| 2017/0108249 A1 | * | 4/2017 | Morishita | F25B 13/00 |

FOREIGN PATENT DOCUMENTS

| | | | |
|---|---|---|---|
| JP | S59-116783 U | | 8/1984 |
| JP | 62280535 A | * | 12/1987 |
| JP | S63-259342 A | | 10/1988 |
| JP | H01-312343 A | | 12/1989 |
| JP | 04-098059 A | | 3/1992 |
| JP | H10-197110 A | | 7/1998 |
| JP | 2001-099529 A | | 4/2001 |
| JP | 2005048983 A | * | 2/2005 |
| JP | 2007155245 A | * | 6/2007 |
| JP | 2009-024957 A | | 2/2009 |
| JP | 2010-019530 A | | 1/2010 |

OTHER PUBLICATIONS

Office Action dated Feb. 21, 2017 issued in corresponding JP patent application No. 2014-084236 (and English translation).
Chinese Office Action dated Jun. 7, 2017 issued in corresponding CN patent application No. 201510175671.6 (and English translation).

* cited by examiner

| NUMBER OF OPERATING INDOOR UNITS | TARGET DISCHARGE TEMPERATURE |
|---|---|
| 1 | 50 |
| 2 | 60 |
| 3 | 68 |
| 4 | 74 |
| 5 | 80 |
| 6 | 80 |

F I G. 2 0

| NUMBER OF INDOOR UNITS PERFORMING HEATING OPERATION [NUMBER] | SET OPERATING FREQUENCY OF COMPRESSOR DURING DEFROSTING OPERATION [Hz] |
|---|---|
| 1 | 40 |
| 2 | 60 |
| 3 | 80 |
| 4 | 100 |
| 5 | 120 |
| 6 | 120 |

| STORED DEFROSTING-OPERATION TIME PERIOD (MINUTE) | HEATING-OPERATION ADJUSTMENT RANGE (MINUTE) | CORRECTION TIME (FOR EACH NUMBER OF INDOOR UNITS PERFORMING HEATING OPERATION) | | | | |
|---|---|---|---|---|---|---|
| | | ONE | TWO | THREE | FOUR | FIVE |
| 0 OR MORE AND LESS THAN 1 | +10 | +5 | +4 | +3 | +2 | 0 |
| 1 OR MORE AND LESS THAN 2 | +5 | +4 | +3 | +2 | +1 | 0 |
| 2 OR MORE AND LESS THAN 3 | 0 | +3 | +2 | +1 | 0 | 0 |
| 3 OR MORE AND LESS THAN 5 | -5 | +2 | +1 | 0 | -1 | -1 |
| 5 OR MORE | -10 | +1 | 0 | -1 | -2 | -2 |

AIR-CONDITIONING APPARATUS

TECHNICAL FIELD

The present invention relates to an air-conditioning apparatus including a single outdoor unit and a plurality of indoor units.

BACKGROUND ART

In a so-called multi-air-conditioning apparatus, a plurality of indoor units can be connected to a single outdoor unit. Therefore, the multi-air-conditioning apparatus is capable of air-conditioning a plurality of rooms even in an apartment having a limited space for installation of the outdoor unit. The above-mentioned multi-air-conditioning apparatus enables space-saving, has high exterior appearance design quality, and is advantageous in terms of costs. Thus, in recent years, the multi-air-conditioning apparatus has been more widely used.

In general, if a heating operation is continued by an air-conditioning apparatus, an outdoor heat exchanger, which functions as an evaporator, is frosted. The frost formation on the outdoor heat exchanger becomes a factor of degradation of heat exchange efficiency, resulting in lowered heating performance. In the case of the multi-air-conditioning apparatus, the plurality of indoor units can be connected to the single outdoor unit. Therefore, when the heating operating is performed, the amount of operation of a condenser is likely to relatively increase. As a result, the multi-air-conditioning apparatus has a problem in that an evaporating pressure of the evaporator is likely to be lowered to more easily form frost.

In order to improve the heating performance that is lowered during the operation, a defrosting operation for melting the frost adhering to the outdoor heat exchanger is performed. The defrosting operation is performed by switching a four-way valve to switch between a heating circuit and a cooling circuit. The cooling circuit functions during the defrosting operation. Therefore, there is a problem in that hot refrigerant does not flow through indoor heat exchangers to result in a lowered room temperature. Therefore, the defrosting operation is desired to be performed at an appropriate timing.

In an ultralow-temperature area, for example, an area in which the temperature becomes −7 degrees Celsius or lower, the humidity does not become high except for under special environments. Therefore, the outdoor heat exchanged is unlikely to be frosted. In a case where the outdoor unit does not include a humidity sensor, the outdoor air humidity cannot be measured. Thus, the defrosting operation is sometimes unnecessarily performed even when the outdoor heat exchanger is not frosted.

Hitherto, there is proposed a freezing detection device for an evaporator of a refrigeration device, which is configured to measure a discharged refrigerant temperature and detect freezing of an evaporator when the degree of decrease in discharged refrigerant temperature becomes equal to or larger than a predetermined value (see, for example, Patent Literature 1).

Besides, there is proposed an air-conditioning apparatus, which is configured to measure a condensing temperature of a condenser and allow the defrosting operation to be performed when a state, in which a temporal change amount of the condensing temperature is equal to or larger than a predetermined value, lasts for a predetermined set time period or longer (see, for example, Patent Literature 2).

CITATION LIST

Patent Literature

Patent Literature 1: Japanese Unexamined Patent Application Publication No. Hei 4-98059
Patent Literature 2: Japanese Unexamined Patent Application Publication No. 2009-24957

SUMMARY OF INVENTION

Technical Problems

In the freezing detection device disclosed in Patent Literature 1, it is determined that the evaporator is in a frozen state when the degree of decrease in discharged temperature becomes equal to or larger than the predetermined value. Therefore, a change in the number of operating indoor units, which is peculiar to the multi-air-conditioning apparatus, cannot be coped with. Thus, there is a problem in that the freezing of the evaporator is erroneously detected based on the decrease in discharged refrigerant temperature, which occurs, for example, when the number of operating indoor units is changed from five to one although the evaporator is not actually frozen. Further, the air-conditioning apparatus disclosed in Patent Literature 2 measures the temporal change amount of the condensing temperature and allows the defrosting operation to be performed when the state, in which the degree of decrease in condensing temperature becomes equal to or larger than the predetermined value, lasts for the predetermined time period or longer. Patent Literature 2 also discloses a configuration that calculates a temporal change amount of the discharge temperature and allows the defrosting operation to be performed when a state, in which the degree of decrease in discharge temperature becomes equal to or larger than a predetermined value, lasts for a predetermined time period or longer. In general, however, when the number of operating indoor units decreases, a refrigerant circulation amount that is necessary as a system of a refrigeration cycle decreases. Therefore, a frequency of the compressor decreases. With the decrease in frequency of the compressor, the condensing temperature and the discharge temperature also decrease. Thus, when the number of operating indoor units decreases, the air-conditioning apparatus disclosed in Patent Literature 2 has a problem in that the frost formation is erroneously detected although the frosted state of the outdoor heat exchanger is not at such a level that the defrosting operation is performed.

Further, in general, the amount of formed frost differs in accordance with operation environmental factors such as the area and the season. It is considered that an appropriate defrosting start timing differs between under conditions where the amount of formed frost is small and under conditions where the amount of formed frost is large. If the defrosting start timing is too early, the defrosting operation is frequently performed. As a result, the room temperature drops. On the other hand, if the defrosting start timing is too late, the heating operation is continued without performing defrosting although the heat exchange performance is lowered due to the frost formation on the outdoor heat exchanger. As a result, there arises a problem in that a blowout temperature of the indoor units drops to prevent sufficient indoor heating. Further, operation noise of the compressor during the defrosting operation and power consumption for the operation are desired to be reduced.

The present invention has been made to solve the problems described above, and has an object to provide an air-conditioning apparatus including a plurality of indoor units for a single outdoor unit, which is capable of determining whether there is occurrence of frost formation on the outdoor unit during a heating operation so as to enable a transition to a defrosting operation at an appropriate timing.

The present invention has another object to set an appropriate heating-operation time period before the transition to the defrosting operation. The present invention has a further object to reduce operation noise of a compressor during the defrosting operation and power consumption for the operation.

Solution to Problem

According to one embodiment of the present invention, there is provided an air-conditioning apparatus, including: a plurality of indoor units; and an outdoor unit including: an outdoor heat exchanger for exchanging heat between refrigerant delivered from the plurality of indoor units and outdoor air; and a compressor for compressing the refrigerant output from the outdoor heat exchanger so as to deliver the compressed refrigerant to the plurality of indoor units. The plurality of indoor units each include an operating-state notifying unit for transmitting operating-state information indicating a self-operating state to the outdoor unit. The outdoor unit includes: a frost-formation determining unit for determining a number of the indoor units performing the heating operation based on the operating-state information and determining whether there is occurrence of frost formation after elapse of a preset time period from a time at which the number of the indoor units performing the heating operation changes; and an operation control unit for performing a defrosting operation when the frost-formation determining unit determines there is the occurrence of the frost formation.

Advantageous Effects of Invention

According to the one embodiment of the present invention, in the air-conditioning apparatus including the plurality of indoor units for the outdoor unit, it is possible to precisely determine the occurrence of the frost formation on the outdoor unit during the heating operation so as to enable the transition to the defrosting operation at the appropriate timing.

Further, according to the one embodiment of the present invention, it is also possible to set an appropriate heating-operation time period before the transition to the defrosting operation. Still further, according to the one embodiment of the present invention, it is also possible to reduce operation noise of the compressor during the defrosting operation and power consumption for the operation.

BRIEF DESCRIPTION OF DRAWINGS

FIG. 20 is an example of an operating-frequency table in which the number of indoor units performing the heating operation and a set operating frequency of a compressor during a defrosting operation are correlated with each other.

DESCRIPTION OF EMBODIMENTS

Embodiment 1

Figure 1:
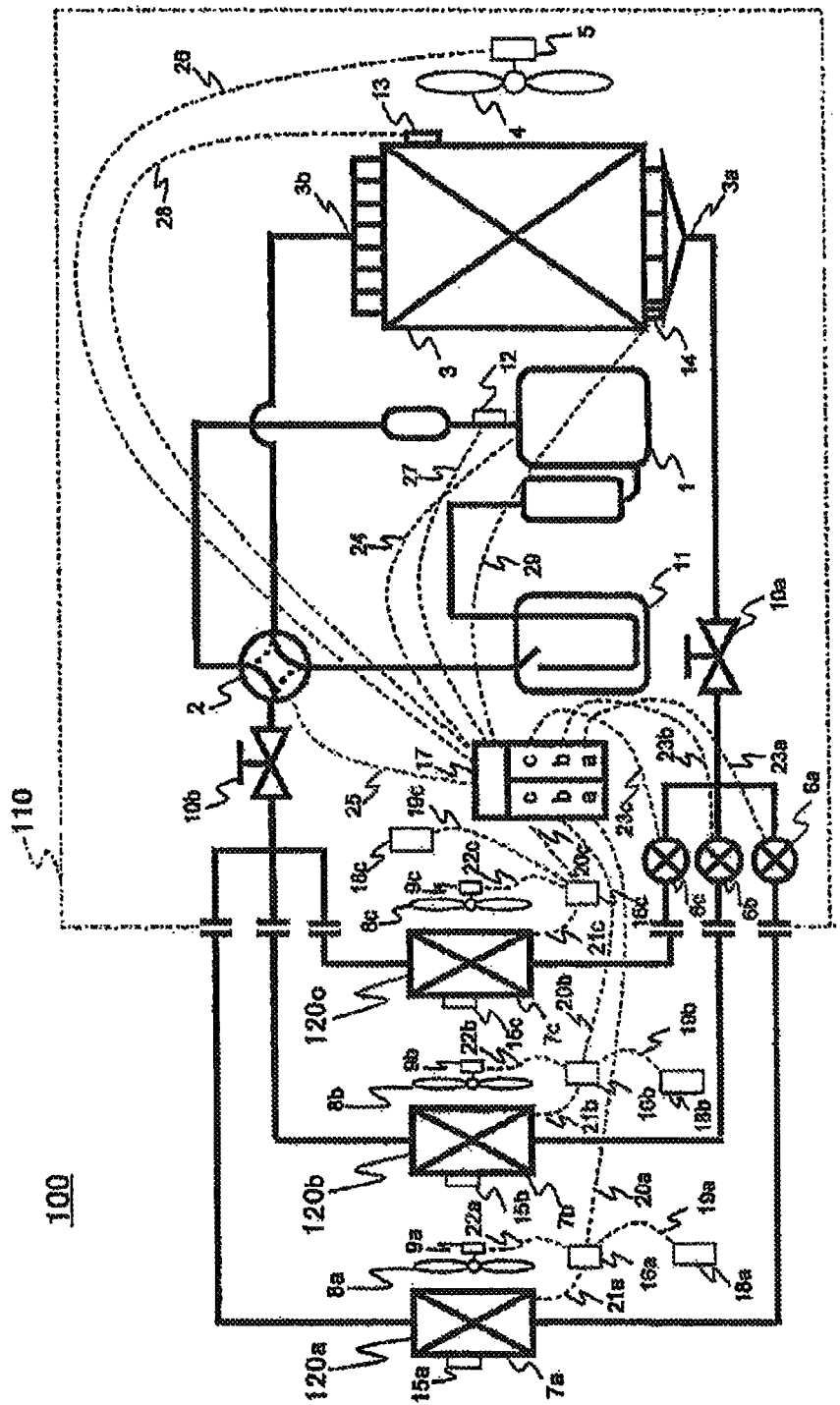
FIG. 1 is a diagram illustrating a configuration of an air-conditioning apparatus according to Embodiment 1 of the present invention.

FIG. 1 is a configuration diagram of an air-conditioning apparatus 100 according to Embodiment 1 of the present invention. The air-conditioning apparatus 100 includes an outdoor unit 110 and indoor units 120a, 120b, and 120c. The air-conditioning apparatus 100 includes a compressor 1, a four-way valve 2, an outdoor heat exchanger 3, an outdoor fan 4, an outdoor fan motor 5, expansion valves 6a to 6c, indoor heat exchangers 7a to 7c, indoor fans 8a to 8c, indoor fan motors 9a to 9c, valves 10a and 10b, a liquid reservoir 11, discharge-temperature measuring means 12, first outdoor heat exchanger refrigerant temperature measuring means 13, second outdoor heat exchanger refrigerant temperature measuring means 14, indoor heat exchanger refrigerant temperature measuring means 15a to 15c, indoor-unit control devices 16a to 16c, and an outdoor-unit control device 17. The compressor 1 compresses refrigerant output from the outdoor heat exchanger 3 and delivers the compressed refrigerant to the indoor units 120a to 120c. The four-way valve 2 switches a direction of flow of the refrigerant. The outdoor heat exchanger 3 is a heat exchanger that exchanges heat between the refrigerant delivered from the indoor units 120a to 120c and outdoor air. The outdoor fan 4 is an air delivering device for delivering air to the outdoor heat exchanger 3. The outdoor fan motor 5 rotationally drives the outdoor fan 4. The expansion valves 6a to 6c reduce a pressure of the refrigerant. The indoor heat exchangers 7a to 7c are heat exchangers that exchange heat between indoor air and the refrigerant. The indoor fans 8a to 8c are air delivering devices that deliver air to the indoor heat exchangers 7a to 7c, respectively. The indoor fan motors 9a to 9c rotationally drive the indoor fans, respectively. The liquid reservoir 11 houses the refrigerant during an operation. The discharge-temperature measuring means 12 measures a compressor discharge temperature. The first outdoor heat exchanger refrigerant temperature measuring means 13 measures a refrigerant temperature at a first position on a refrigerant passage in the outdoor heat exchanger 3. The second outdoor heat exchanger refrigerant temperature measuring means 14 measures the refrigerant temperature at a second position on the refrigerant passage in the outdoor heat exchanger 3. The indoor heat exchanger refrigerant temperature measuring means 15a to 15c measure the refrigerant temperatures in the indoor heat exchangers, respectively. The indoor-unit control devices 16a to 16c control the indoor units, respectively. The outdoor-unit control device 17 controls the outdoor unit. Among the above-mentioned components, the compressor 1, the four-way valve 2, the outdoor heat exchanger 3, the outdoor fan 4, the outdoor fan motor 5, the expansion valves 6a to 6c, the valves 10a and 10b, the liquid reservoir 11, the discharge-temperature measuring means 12, the first outdoor heat exchanger refrigerant temperature measuring means 13, the second outdoor heat exchanger refrigerant temperature measuring means 14, and the outdoor-unit control device 17 are included in the outdoor unit 110. The indoor heat exchanger 7a, the indoor fan 8a, the indoor fan motor 9a, the indoor heat exchanger refrigerant temperature measuring means 15a, and the indoor-unit control device 16a are included in the indoor unit 120a. Similarly, the indoor heat exchangers 7b and 7c, the indoor fans 8b and 8c, the indoor fan motors 9b and 9c, the indoor heat exchanger refrigerant temperature measuring means 15b and 15c, and the indoor-unit control devices 16b and 16c are respectively included in the indoor units 120b and 120c. The compressor 1 is, for example, a compressor having a changeable frequency. An opening degree of each of the expansion valves 6a to 6c is variable and can be controlled by an operation control unit 17-5 (FIG. 3) of the outdoor-unit control device 17. Further, the indoor units 120a to 120c are connected to the outdoor unit 110 by refrigerant pipes to form a refrigerant circuit for circulating the refrigerant.

Figure 2:
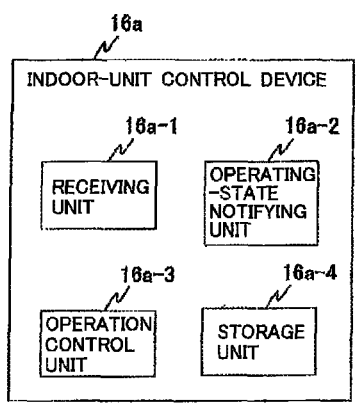
FIG. 2 is a block diagram illustrating a configuration of an indoor-unit control device illustrated in FIG. 1.

FIG. 2 is a diagram illustrating a configuration of the indoor-unit control device 16a. A receiving unit 16a-1 receives a signal transmitted from a remote controller 18a. The signal is, for example, an operating-state switching signal for switching an operating state of the indoor unit 120a between a stopped state, a heating-operation state, and a cooling-operation state or a temperature change signal for changing setting of an indoor temperature. An operating-state notifying unit 16a-2 transmits an operation command together with information indicating an operating state (hereinafter referred to as "operating-state information") when the operating state is switched between the stopped state, the heating-operation state, and the cooling-operation state through a wiring 20a so as to notify the outdoor-unit control device 17 that the indoor unit 120a has started the operation. An operation control unit 16a-3 performs control for the indoor unit 120a such as adjustment of a rotation speed of the indoor fan motor 9a in accordance with the operating state. A storage unit 16a-4 stores information and data such as measured temperature and time, preset threshold value, temperature and time, and the operating state. Each of the indoor-unit control devices 16b and 16c has the same configuration as that described above.

Figure 3:
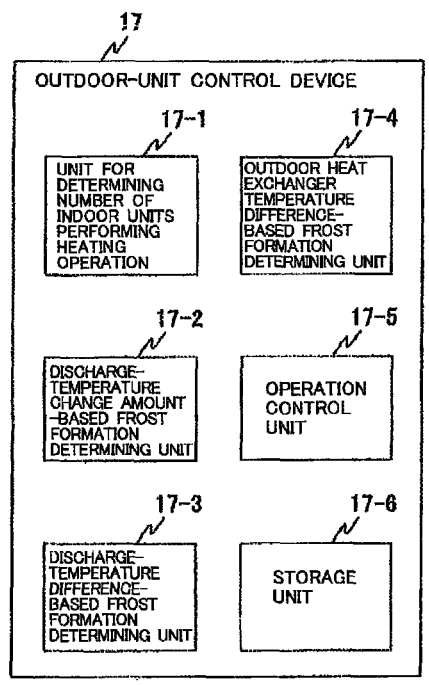
FIG. 3 is a block diagram illustrating a configuration of an outdoor-unit control device illustrated in FIG. 1.

FIG. 3 is a diagram illustrating a configuration of the outdoor-unit control device 17. A unit 17-1 for determining the number of indoor units performing heating operation determines the number of indoor units that are performing the heating operation based on the operating-state information respectively transmitted from the indoor units 120a to 120c. A discharge-temperature change amount-based frost formation determining unit 17-2 measures a temporal change amount of a refrigerant discharge temperature from the compressor 1 to determine whether or not the outdoor heat exchanger 3 is frosted based on the temporal change amount. The details thereof are described later (Step S7 in FIG. 5 and FIG. 9). A discharge-temperature difference-based frost formation determining unit 17-3 determines whether or not the outdoor heat exchanger 3 is frosted based on a difference between a measured value of the refrigerant discharge temperature from the compressor 1 and a target value of the refrigerant discharge temperature, which is set based on the number of the indoor units 120*a* to 120*c* that are performing the heating operation. The details thereof are described later (Step S8 in FIG. 5 and FIG. 12). An outdoor heat exchanger temperature difference-based frost formation determining unit 17-4 determines whether or not the outdoor heat exchanger 3 is frosted based on a difference between refrigerant temperatures measured at two positions on a refrigerant passage (not shown) in the outdoor heat exchanger 3. The details thereof are described later (Step S9 in FIG. 5 and FIG. 15). An operation control unit 17-5 performs control so that a defrosting operation is performed when the discharge-temperature change amount-based frost formation determining unit 17-2, the discharge-temperature difference-based frost formation determining unit 17-3, and the outdoor heat exchanger temperature difference-based frost formation determining unit 17-4 determine the occurrence of frost formation. Further, the operation control unit 17-5 performs control for the outdoor unit 110, such as control to operate and stop the compressor 1, control to switch the four-way valve 2, adjustment of the rotation speed of the outdoor fan motor 5, adjustment of the opening degree of each of the expansion valves 6*a* to 6*c*, and control to open and close the valves 10*a* and 10*b*. A storage unit 17-6 stores information and data such as measured temperature and time, preset threshold value, temperature and time, and the operating states of the indoor units 120*a* to 120*c*.

Figures 4A, 4B:
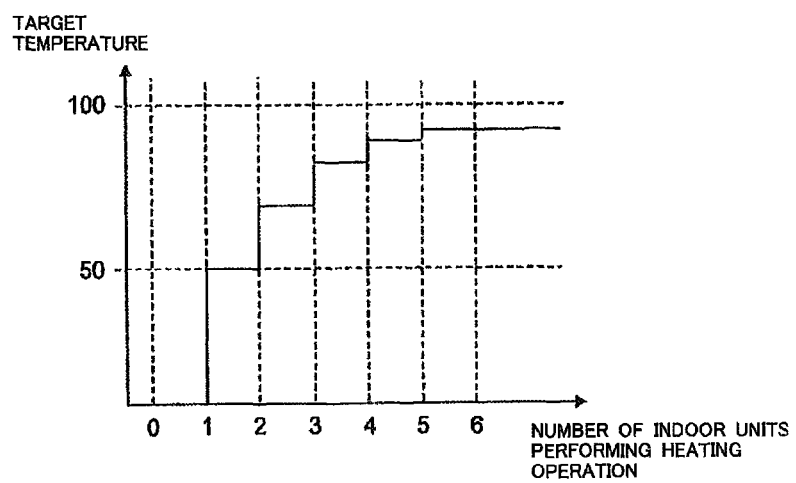
FIG. 4A is an example of a target discharge temperature table showing a relationship between the number of indoor units performing a heating operation and a target discharge temperature.
FIG. 4B is an example of a graph showing a relationship between the number of operating indoor units and the target discharge temperature.

FIG. 4A is an example of a target discharge temperature table showing a relationship between the number of indoor units performing the heating operation and the target discharge temperature. FIG. 4B is an example of a graph showing the relationship between the number of indoor units performing the heating operation and the target discharge temperature. Although the number of indoor units 120*a* to 120*c* is three in FIG. 1, FIGS. 4A and 4B show an example where the number of indoor units performing the heating operation is increased up to six. In the example shown in FIGS. 4A and 4B, the target discharge temperature increases as the number of indoor units performing the heating operation increases from one to five and becomes constant after the number of indoor units performing the heating operation becomes five and more. For example, as shown in FIG. 4A, the target discharge temperature is 50 degrees Celsius, 60 degrees Celsius, 68 degrees Celsius, 74 degrees Celsius, 80 degrees Celsius, and 80 degrees Celsius when the number of indoor units performing the heating operation is one, two, three, four, five, and six, respectively. A range of increase in target discharge temperature decreases as the number of indoor units performing the heating operation increases from one to five. Specifically, as the number of indoor units performing the heating operation increases, the increase in target discharge temperature becomes gentler. As described above, up to a predetermined number of indoor units performing the heating operation, the increase in target discharge temperature becomes gentler as the number of indoor units performing the heating operation increases. After the number of indoor units performing the heating operation reaches the predetermined number, the target discharge temperature becomes constant. If the target temperature increases unlimitedly in proportion to an increase in the number of indoor units performing the heating operation, a heat exchange amount of the outdoor heat exchanger 3 and a total heat exchange amount of the indoor heat exchangers become imbalanced to lower heat exchange efficiency. On the other hand, when the number of indoor units performing the heating operation and the target discharge temperature are set as shown in FIGS. 4A and 4B, the heat exchange amount of the indoor units and the heat exchange amount of the outdoor unit are balanced to enable the operation while preventing the heat exchange efficiency from being lowered. The unit 17-1 for determining the number of indoor units performing heating operation retains the target discharge temperature table. The relationship between the number of indoor units performing the heating operation and the target discharge temperature is an example, and therefore is not limited thereto.

Next, an operation of the air-conditioning apparatus 100 during the heating operation is described.

During the heating operation, a gas refrigerant at a high temperature and a high pressure, which is discharged from the compressor 1, flows toward the four-way valve 2. Passages in the four-way valve 2 during the heating operation are indicated by the solid line in FIG. 1. The gas refrigerant passes through the four-way valve 2 to flow into the indoor heat exchangers 7*a* to 7*c* respectively provided in the indoor units 120*a* to 120*c*. Thereafter, in the indoor heat exchangers 7*a* to 7*c*, the gas refrigerant condenses and liquefies while rejecting heat to indoor air. As a result, the gas refrigerant becomes a high-pressure liquid refrigerant. At this time, the indoor air, which is sent to the indoor heat exchangers 7*a* to 7*c* by the indoor fans 8*a* to 8*c*, is heated by the indoor heat exchangers 7*a* to 7*c*. By the operation described above, a heating effect is obtained. The high-pressure liquid refrigerant exiting from the indoor heat exchangers 7*a* to 7*c* flows toward the outdoor unit 110.

A pressure of the high-pressure liquid refrigerant, which returns to the outdoor unit 110, is reduced by the expansion valves 6*a* to 6*c*. As a result, the liquid refrigerant is brought into a two-phase state at a low pressure and then flows into the outdoor heat exchanger 3. The high-pressure liquid refrigerant absorbs heat from outdoor air sent by the outdoor fan 4 to evaporate to become a low-pressure gas refrigerant. Thereafter, the low-pressure gas refrigerant flows into the liquid reservoir 11 through the four-way valve 2 to return to the compressor 1. The compressor 1 compresses the low-pressure gas refrigerant at a high pressure and then discharges the thus compressed gas refrigerant.

Subsequently, an operation of the air-conditioning apparatus 100 during the defrosting operation is described. Passages in the four-way valve 2 during the defrosting operation are indicated by the broken line in FIG. 1. When the heating operation is switched to the defrosting operation, the passages in the four-way valve 2 are also switched. The gas refrigerant at a high temperature and a high pressure discharged from the compressor 1 passes through the four-way valve 2 to flow into the outdoor heat exchanger 3. The gas refrigerant condenses and liquefies in the outdoor heat exchanger 3 to become a high-pressure liquid refrigerant. At this time, the frost adhering to the outdoor heat exchanger 3 is melted and removed by heat of the gas refrigerant at a high temperature and a high pressure, which flows into the outdoor heat exchanger 3.

Figure 5:
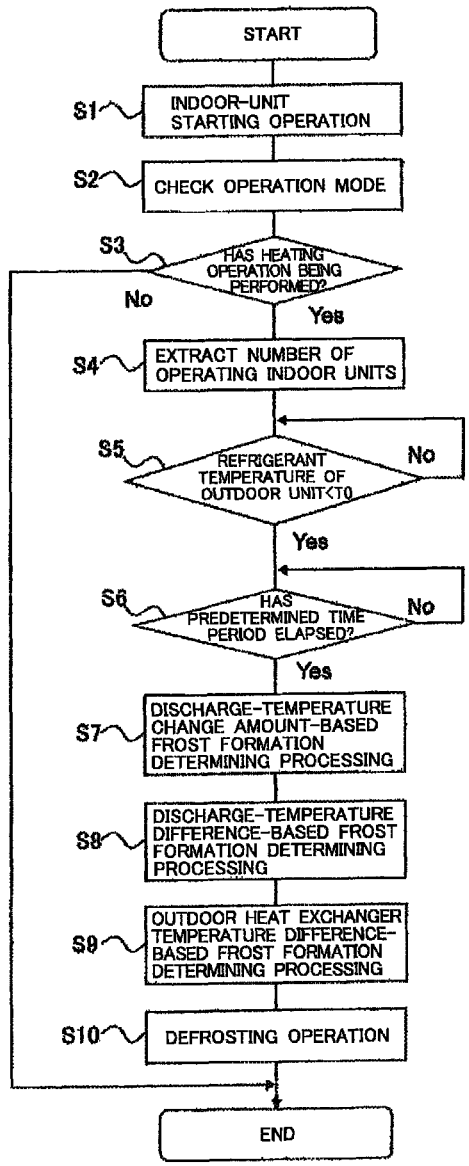
FIG. 5 is a flowchart illustrating a frost-formation determination flow for the air-conditioning apparatus illustrated in FIG. 1.

Frost-formation determining processing performed by the air-conditioning apparatus 100 is now described referring to FIG. 5.

Figure 6:
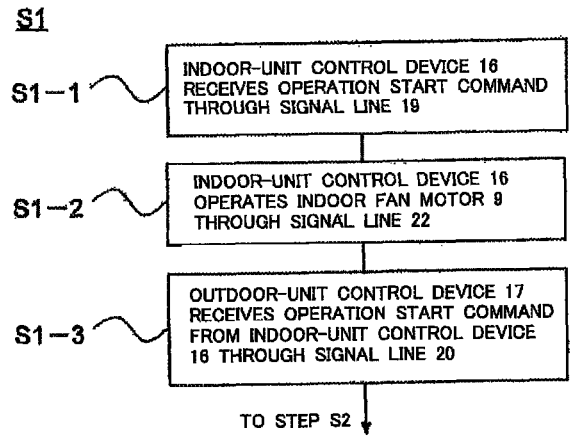
FIG. 6 is a detailed flowchart of indoor-unit starting operation processing (Step S1) illustrated in FIG. 5.

First, when an operation starting operation for the indoor unit 120*a* is performed by using the remote controller 18*a*, the indoor-unit control device 16*a* of the indoor unit 120*a* starts indoor-unit starting operation processing (Step S1). A detailed flow of the indoor-unit starting operation processing is illustrated in FIG. 6. When an operation button of the remote controller 18*a* is pressed, the indoor-unit control device 16*a* receives an operation start command through a wiring 19*a* (Step S1-1). Communication through the wiring 19*a* may be wired or wireless. The indoor-unit control device 16*a* operates the indoor fan motor 9*a* at a predetermined rotation speed through a wiring 22*a* (Step S1-2) and transmits an operation command together with operation control information to the outdoor-unit control device 17 through the wiring 20*a* to notify that the indoor unit 120*a* has started the operation (Step S1-3).

Figure 7:
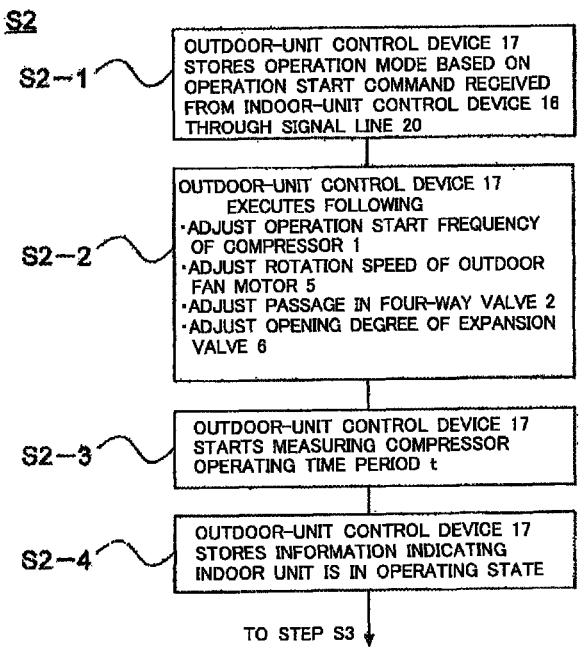
FIG. 7 is a detailed flowchart of operation-mode check processing (Step S2) illustrated in FIG. 5.

The operation control unit 17-5 performs operation-mode check processing (Step S2 in FIG. 5) in accordance with the operation command. A detailed flow of the operation-mode check processing is illustrated in FIG. 7. When the operation control unit 17-5 receives the operation command through the wiring 20*a*, the storage unit 17-6 stores an operation mode of the indoor unit that transmits the operation command (Step S2-1). In this case, it is assumed that the indoor unit that transmits the operation mode is the indoor unit 120*a* and the operation mode of the indoor unit 120*a* is a heating-operation mode. The operation command includes information indicating that the operation mode of the indoor unit 120*a* is the heating-operation mode. The operation control unit 17-5 recognizes that the indoor unit 120*a* has started the heating operation, sets an operating frequency of the compressor 1, a rotation speed of the indoor fan motor 5, and the passage in the four-way valve 2 for the heating-operation mode, and opens the expansion valve 6*a* by a predetermined opening degree (Step S2-2). Further, the operation control unit 17-5 starts measuring an operating time period t of the compressor 1 (Step S2-3). Further, the storage unit 17-6 stores information indicating the indoor unit 120*a* is in the operating state (Step S2-4). When the operation mode of the indoor unit 120*a* is a cooling-operation mode, the above-mentioned processing flow is terminated (Step S3).

Figure 8:
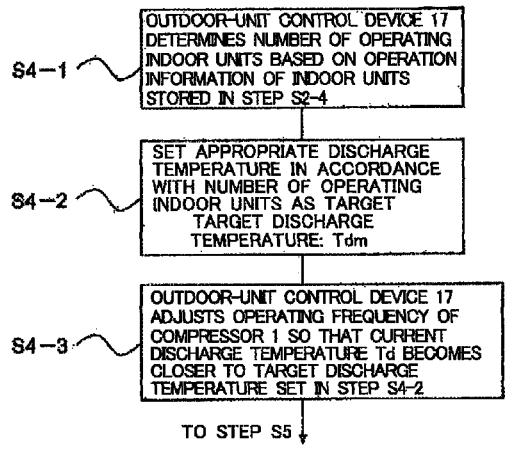
FIG. 8 is a detailed flowchart of processing for determining the number of operating indoor units (Step S4) illustrated in FIG. 5.

Next, the unit 17-1 for determining the number of indoor units performing heating operation of the indoor-unit control device 17 performs processing for determining the number of indoor units performing the heating operation (Step S4 in FIG. 5). A detailed flow of the processing for determining the number of indoor units performing the heating operation is illustrated in FIG. 8. The unit 17-1 for determining the number of indoor units performing heating operation determines the number of indoor units performing the heating operation (hereinafter referred to as "operating indoor units") based on the operation mode of each of the indoor units 120*a* to 120*c*, which is stored in the storage unit 17-6 (Step S4-1). Then, the unit 17-1 for determining the number of indoor units performing heating operation sets an appropriate discharge temperature in accordance with the number of operating indoor units as a target discharge temperature Tdm and stores the thus set target discharge temperature Tdm in the storage unit 17-6 (Step S4-2). Further, the unit 17-1 for determining the number of indoor units performing heating operation adjusts the operating frequency of the compressor 1 so that a discharge temperature Td becomes closer to the set target discharge temperature Tdm (Step S4-3).

Next, the operation control unit 17-5 of the outdoor-unit control device 17 determines whether or not the refrigerant temperature measured by the second outdoor heat exchanger refrigerant temperature measuring means 14 is equal to or lower than a preset temperature T0 (Step S5). The temperature T0 is a threshold temperature for determining whether or not there is a possibility of frost formation on the outdoor heat exchanger 3. The operation control unit 17-5 determines that there is a possibility of frost formation when the measured refrigerant temperature is equal to or lower than the temperature T0. Therefore, the processing proceeds to subsequent Step S6. Specifically, if the outdoor heat exchanger 3 is not frosted to gradually lower the refrigerant temperature so that the refrigerant temperature at a refrigerant inlet of the outdoor heat exchanger 3 becomes equal to or lower than the temperature T0, the defrosting operation is not performed. The temperature T0 is, for example, −2 degrees Celsius.

The operation control unit 17-5 determines whether or not a preset time period t1 has elapsed from an operation start time t0 (Step S6). When the time period t1 (for example, thirty minutes) has not elapsed, the operation continues until the predetermined time period t1 elapses. When the time period t1 has elapsed, the processing proceeds to Step S7.

Figure 9:
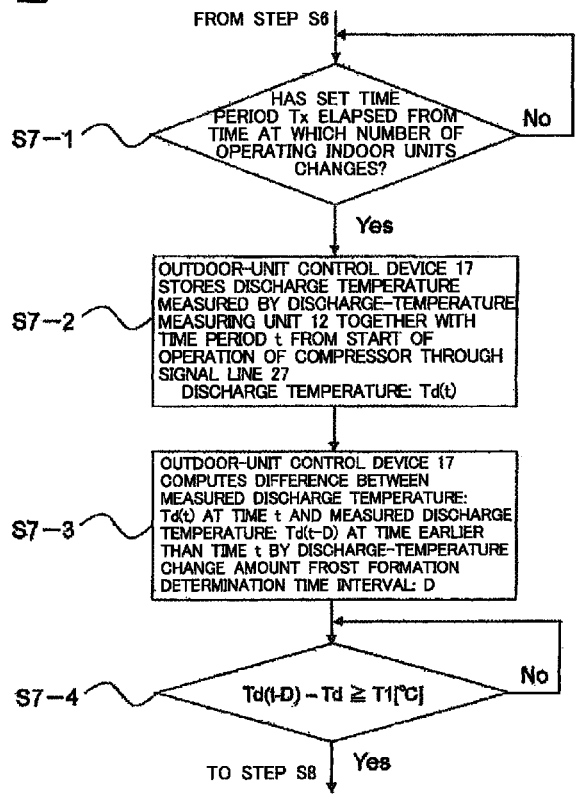
FIG. 9 is a detailed flowchart of discharge-temperature change amount-based frost formation determining processing (Step S7) illustrated in FIG. 5.
Figure 10:
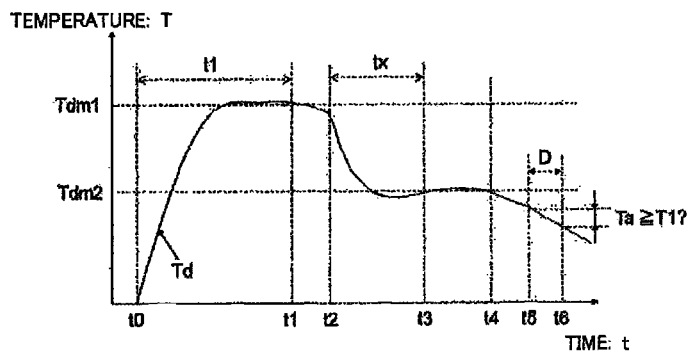
FIG. 10 is a time chart showing a relationship between a measured discharge temperature and a temporal change amount thereof in a case where the number of operating indoor units decreases when the processing illustrated in FIG. 9 is performed.
Figure 11:
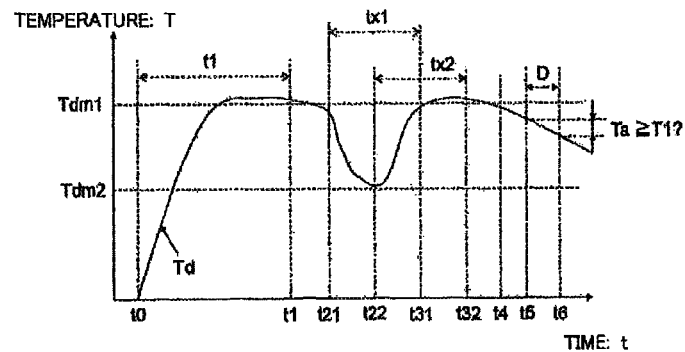
FIG. 11 is a time chart showing the relationship between the measured discharge temperature and the temporal change amount thereof in a case where the number of operating indoor units first decreases and then increases when the processing illustrated in FIG. 9 is performed.

Next, the discharge-temperature change amount-based frost formation determining unit 17-2 performs discharge-temperature change amount-based frost formation determining processing (Step S7 in FIG. 5). A detailed flow of the discharge-temperature change amount-based frost formation determining processing is illustrated in FIG. 9. FIG. 10 is a time chart showing a relationship between the measured discharge temperature Td and a temporal change amount Ta thereof in a case where the number of operating indoor units decreases when the above-mentioned processing is performed. FIG. 11 is a time chart showing a relationship between the measured discharge temperature Td and the temporal change amount Ta thereof in a case where the number of operating indoor units first decreases and then increases when the above-mentioned processing is performed.

The discharge-temperature change amount-based frost formation determining unit 17-2 first determines whether or not a preset waiting time period Tx has elapsed from a time at which the number of operating indoor units changes (Step S7-1). When the waiting time period Tx has elapsed, the discharge-temperature change amount-based frost formation determining unit 17-2 controls the storage unit 17-6 to continuously store the discharge temperature measured by the discharge-temperature measuring means 12 (hereinafter referred to as "measured discharge temperature") through a signal line 27 as a function Td(t) of the compressor operating time period t from the start of the operation of the compression (Step S7-2). Then, the discharge-temperature change amount-based frost formation determining unit 17-2 calculates a difference Ta (hereinafter referred to as "discharge-temperature change amount Ta") between the stored current measured discharge temperature Td(t) and a measured discharge temperature Td(t-D) at a time earlier than the current time by a preset discharge-temperature change amount frost formation determination time interval D (hereinafter referred to simply as "calculated time interval D") (Step S7-3). When the discharge-temperature change amount Ta is equal to or larger than a preset temperature change amount threshold value T1 (for example, 5 degrees Celsius), the discharge-temperature change amount-based frost formation determining unit 17-2 determines that there is a possibility that the outdoor heat exchanger 3 is frosted. Then, the processing proceeds to a subsequent step (Step S7-4). Specifically, in the processing described above, the discharge-temperature change amount-based frost formation determining unit 17-2 determines there is the occurrence of frost formation based on the lowered measured discharge temperature with elapse of time. The discharge-temperature change amount-based frost formation determining unit 17-2 may determine that there is a possibility of frost formation immediately at a time when the discharge-temperature change amount Ta becomes equal to or larger than the temperature change amount threshold value T1 or may also determine that there is a possibility of frost formation when a state in which the discharge-temperature change amount Ta is equal to or larger than the temperature change amount threshold value T1 lasts for a preset time period or longer.

The measured discharge temperature Td shown in FIG. 10 increases to a target discharge temperature Tdm1 in accordance with three operating indoor units after the start of the heating operation of the indoor units 120a to 120c at an operation start time t0 and greatly decreases to a target discharge temperature Tdm2 in accordance with the number of operating indoor units reduced to two due to the stop of the operation of the indoor unit 120c at a time t2. Then, after a time t4, the measured discharge temperature Td gradually decreases due to frost formation. The discharge-temperature change amount-based frost formation determining unit 17-2 performs the discharge-temperature change amount-based frost formation determining processing after a time t3 corresponding a time at which the waiting time period Tx elapses from the time t2. In other words, the discharge-temperature change amount-based frost formation determining unit 17-2 does not perform the discharge-temperature change amount-based frost formation determining processing until the waiting time period Tx elapses from the time t2. Although the measured discharge temperature Td starts decreasing greatly at the time t2, the discharge-temperature change amount-based frost formation determining unit 17-2 does not perform the discharge-temperature change amount-based frost formation determining processing during the waiting time period Tx. Therefore, the erroneous determination of the occurrence of frost formation in a case where the number of indoor units performing the heating operation decreases can be prevented. The discharge-temperature change amount-based frost formation determining unit 17-2 starts the discharge-temperature change amount-based frost formation processing at the time t3 and detects the occurrence of frost formation at a time t6.

The measured discharge temperature Td shown in FIG. 11 increases to the target discharge temperature Tdm1 in accordance with three operating indoor units after the start of the heating operation of the indoor units 120a to 120c at the operation start time t0. Then, the measured discharge temperature Td greatly decreases to the target discharge temperature Tdm2 in accordance with the number of operating indoor units reduced to two due to the stop of the operation of the indoor unit 120c at a time t21, greatly increases to the target discharge temperature Tdm1 in accordance with the number of operating indoor units increased to three due to restart of the heating operation of the indoor unit 120c at a time t22, and starts gradually decreasing at the time t4 due to the frost formation. Although the measured discharge temperature Td starts decreasing greatly at the time t21, the discharge-temperature change amount-based frost formation determining unit 17-2 does not perform the discharge-temperature change amount-based frost formation determining processing during a waiting time period Tx1, that is, until a time t31. Although the measured discharge temperature Td starts increasing greatly at the time t22, the discharge-temperature change amount-based frost formation determining unit 17-2 does not perform the discharge-temperature change amount-based frost formation determining processing even during a waiting time period Tx2. As described above, when the number of indoor units performing the heating operation changes during the waiting time period Tx1, the discharge-temperature change amount-based frost formation determining unit 17-2 waits until the waiting time period Tx2, which starts at the time t22 at which the number of indoor units performing the heating operation changes, elapses. With the configuration described above, the erroneous determination of the occurrence of frost formation can be prevented in the case where the number of indoor units performing the heating operation decreases. The discharge-temperature change amount-based frost formation determining unit 17-2 starts the discharge-temperature change amount-based frost formation determining processing at a time t32 and detects the occurrence of frost formation at the time t6.

Figure 12:
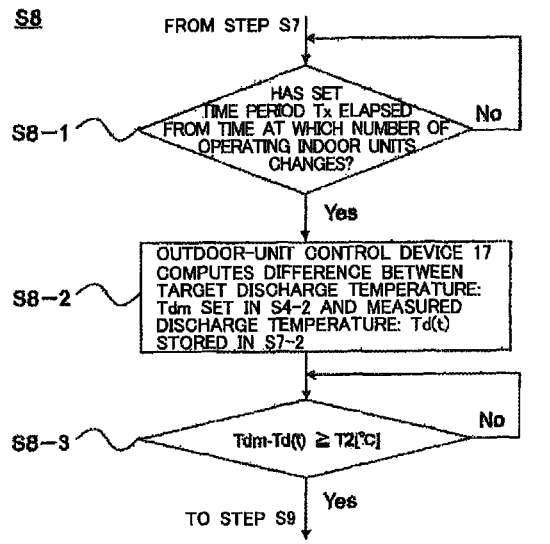
FIG. 12 is a detailed flowchart of discharge-temperature difference-based frost formation determining processing (Step S8) illustrated in FIG. 5.
Figure 13:
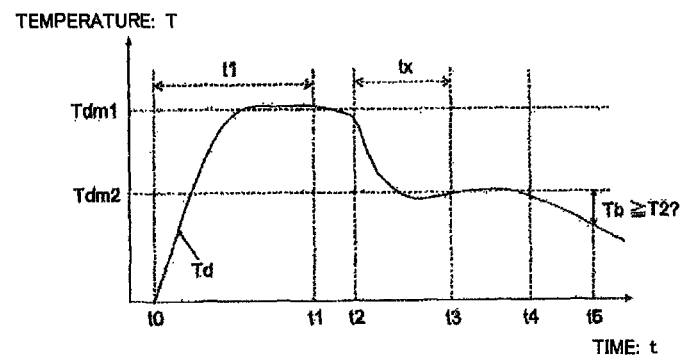
FIG. 13 is a time chart showing a relationship between the measured discharge temperature and the target discharge temperature in a case where the number of operating indoor units decreases when the processing illustrated in FIG. 12 is performed.
Figure 14:
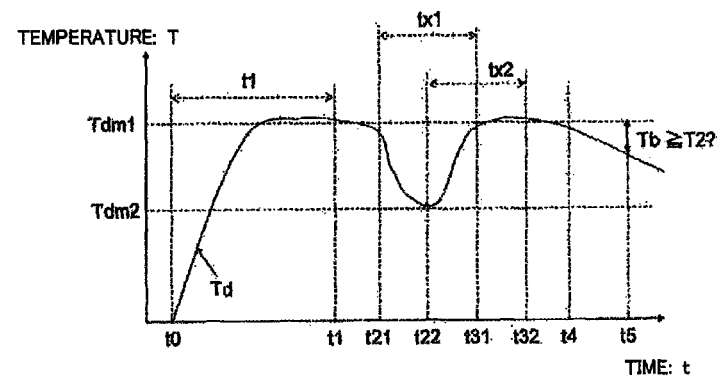
FIG. 14 is a time chart showing a relationship between the measured discharge temperature and the target discharge temperature in a case where the number of operating indoor units first decreases and then increases when the processing illustrated in FIG. 12 is performed.

Next, the discharge-temperature difference-based frost formation determining unit 17-3 performs discharge-temperature difference-based frost formation determining processing (Step S8 in FIG. 5). A detailed flow of the discharge-temperature difference-based frost formation determining processing is illustrated in FIG. 12. FIG. 13 is a time chart showing a relationship between the measured discharge temperature Td and a target discharge temperature Tdm in a case where the number of operating indoor units decreases when the above-mentioned processing is performed. FIG. 14 is a time chart showing a relationship between the measured discharge temperature Td and the target discharge temperature Tdm in a case where the number of operating indoor units first decreases and then increases when the above-mentioned processing is performed.

The discharge-temperature difference-based frost formation determining unit 17-3 first determines whether or not the waiting time period Tx has elapsed from a time at which the number of operating indoor units changes (Step S8-1). When the waiting time period Tx has elapsed, the discharge-temperature difference-based frost formation determining unit 17-3 calculates a difference Tb (hereinafter referred to as "discharge-temperature difference Tb") between the target discharge temperature Tdm stored in the storage unit 17-6 and the current measured discharge temperature Td(t) stored in the storage unit 17-6 (Step S8-2). When the discharge-temperature difference Tb=Tdm−Td(t) is equal to or larger than a preset temperature difference threshold value T2 (for example, 3 degrees Celsius), the discharge-temperature difference-based frost formation determining unit 17-3 determines that the outdoor heat exchanger 3 is frosted (Step S8-3). Then, the processing proceeds to a subsequent step. Specifically, in the processing described above, the discharge-temperature difference-based frost formation determining unit 17-3 determines there is the occurrence of frost formation based on the measured discharge temperature Td(t) lower than the target discharge temperature Tdm by a predetermined amount. The discharge-temperature difference-based frost formation determining unit 17-3 may determine the occurrence of frost formation immediately at a time when the discharge-temperature difference Tb becomes equal to or larger than the temperature difference threshold value T2 or may also determine the occurrence of frost formation when a state in which the discharge-temperature difference Tb is equal to or larger than the temperature difference threshold value T2 lasts for a preset time period or longer.

The measured discharge temperature Td shown in FIG. 13 starts increasing at the operation start time t0 to become the target discharge temperature Tdm1 in accordance with three operating indoor units. At the time t2, the measured discharge temperature Td greatly decreases to the target discharge temperature Tdm2 in accordance with the number of operating indoor units reduced to two due to the stop of the operation of the indoor unit 120c. At the time t4, the measured discharge temperature Td starts gradually decreasing due to the frost formation. The discharge-temperature difference-based frost formation determining unit 17-3 performs the discharge-temperature difference-based frost formation determining processing after the time t3, which is a time at which the waiting time period Tx elapses from the time t2. In other words, the discharge-temperature difference-based frost formation determining unit 17-3 does not perform the discharge-temperature difference-based frost formation determining processing until the waiting time period Tx elapses from the time t2. Although the measured discharge temperature Td starts decreasing greatly at the time t2, the discharge-temperature difference-based frost formation determining unit 17-3 does not perform the discharge-temperature difference-based frost formation determining processing during the waiting time period Tx. Therefore, the erroneous detection of the occurrence of frost formation can be prevented in the case where the number of indoor units performing the heating operation decreases. The discharge-temperature difference-based frost formation determining unit 17-3 starts performing the discharge-temperature difference-based frost formation determining processing at the time t3 and detects the occurrence of frost formation at a time t5.

The measured discharge temperature Td shown in FIG. 14 starts increasing at the operation start time t0 by the start of the heating operation of the indoor units 120a to 120c to become the target discharge temperature Tdm1 in accordance with three operating indoor units. Thereafter, the measured discharge temperature Td greatly decreases to the target discharge temperature Tdm2 in accordance with the number of operating indoor units reduced to two due to the stop of the operation of the indoor unit 120c at the time t21 and then greatly increases to the target discharge temperature Tdm1 in accordance with the number of operating indoor units increased to three due to the restart of the heating operation of the indoor unit 120c at the time t22. At the time t4, the measured discharge temperature Td starts gradually decreasing due to the frost formation. Although the measured discharge temperature Td starts decreasing greatly at the time t21, the discharge-temperature difference-based frost formation determining unit 17-3 does not perform the discharge-temperature difference-based frost formation determining processing during the waiting time period Tx1, specifically, until the time t31. Although the measured discharge temperature Td starts increasing greatly at the time t22, the discharge-temperature difference-based frost formation determining unit 17-3 does not perform the discharge-temperature difference-based frost formation determining processing even during the waiting time period Tx2. When the number of indoor units performing the heating operation changes during the waiting time period Tx1 as described above, the discharge-temperature difference-based frost formation determining unit 17-3 waits for elapse of the waiting time period Tx2 from the time t3 at which the number of indoor units performing the heating operation changes. With the configuration described above, the erroneous detection of the occurrence of frost formation can be prevented in the case where the number of indoor units performing the heating operation decreases. The discharge-temperature difference-based frost formation determining unit 17-3 starts performing the discharge-temperature difference-based frost formation determining processing at the time t32 and detects the occurrence of frost formation at the time t5.

Figure 15:
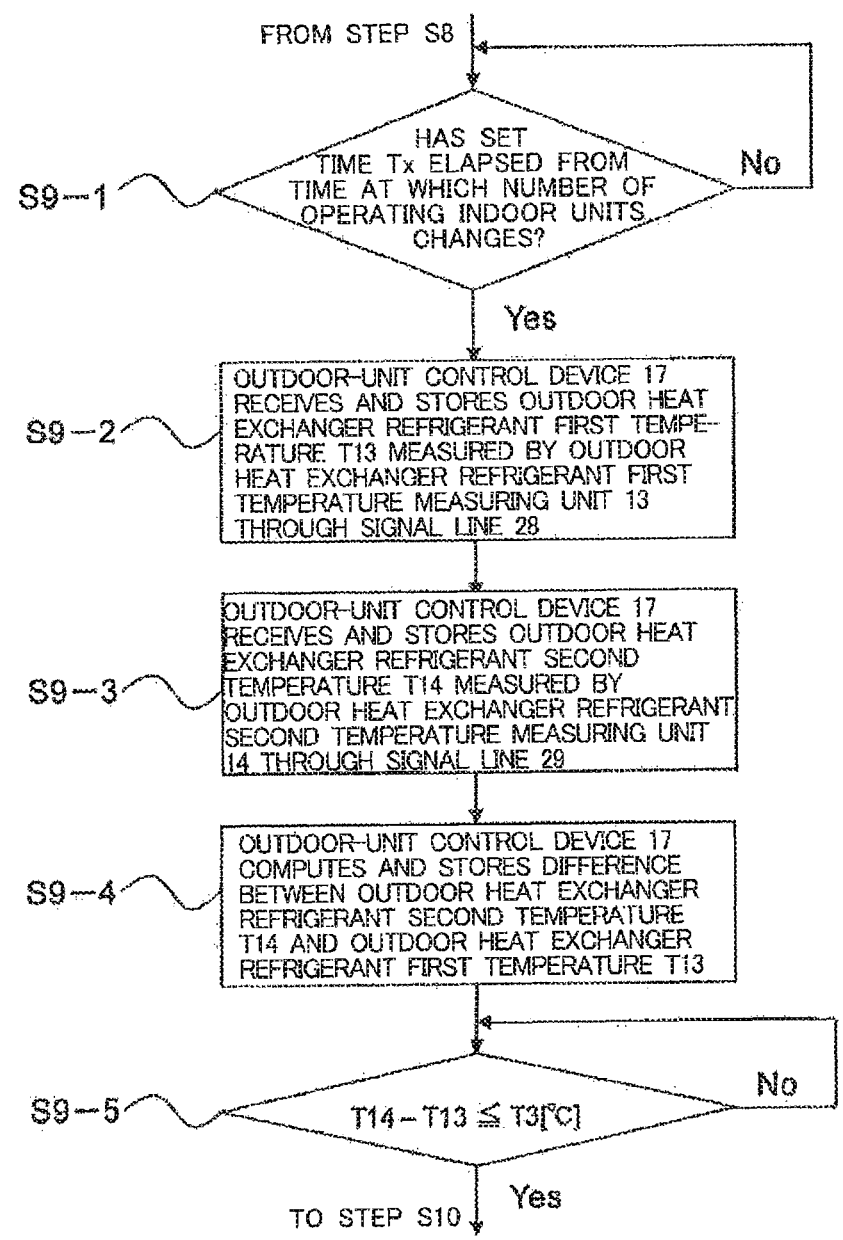
FIG. 15 is a detailed flowchart illustrating outdoor heat exchanger temperature difference-based frost formation determining processing (Step S9) illustrated in FIG. 5.
Figure 16:
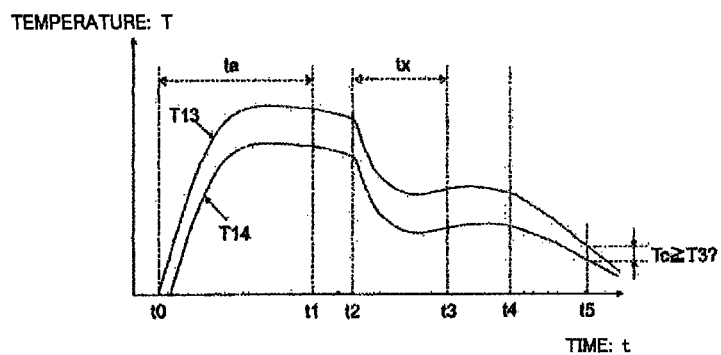
FIG. 16 is a time chart showing a relationship between temperatures at two positions on a refrigerant passage in an outdoor heat exchanger in a case where the number of operating indoor units decreases when the processing illustrated in FIG. 15 is performed.
Figure 17:
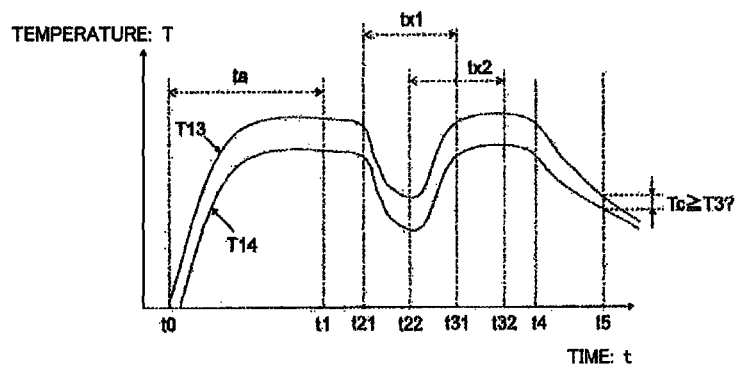
FIG. 17 is a timing chart illustrating the relationship between the temperatures at the two positions on the refrigerant passage in the outdoor heat exchanger in a case where the number of operating indoor units first decreases and then increases in the air-conditioning apparatus when the processing illustrated in FIG. 15 is performed.
Figure 18:
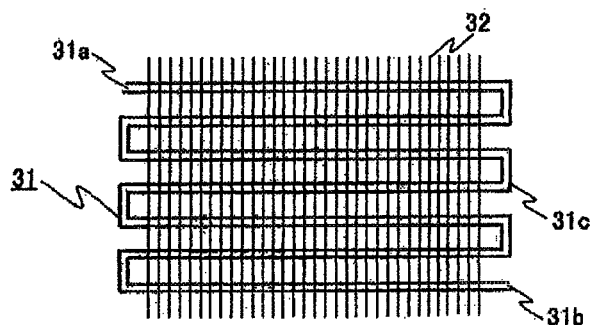
FIG. 18 is a simplified diagram of fins and a refrigerant pipe included in the outdoor heat exchanger illustrated in FIG. 1.

Next, the outdoor heat exchanger temperature difference-based frost formation determining unit 17-4 performs outdoor heat exchanger temperature difference-based frost formation determining processing (Step S9 in FIG. 5). A detailed flow of the outdoor heat exchanger temperature difference-based frost formation determining processing is illustrated in FIG. 15. FIG. 16 is a time chart showing a relationship between the first outdoor heat exchanger refrigerant temperature T13 and the second outdoor heat exchanger refrigerant temperature T14 in a case where the number of operating indoor units decreases when the above-mentioned processing is performed. FIG. 17 is a time chart showing a relationship between the first outdoor heat exchanger refrigerant temperature T13 and the second outdoor heat exchanger refrigerant temperature T14 in a case where the number of operating indoor units first decreases and then increases when the above-mentioned processing is performed. The first outdoor heat exchanger refrigerant temperature T13 becomes higher than the second outdoor heat exchanger refrigerant temperature T14 by the function of the outdoor heat exchanger 3 for taking heat from the outdoor air. As illustrated in FIG. 18, the outdoor heat exchanger 3 includes a plurality of fins 32 and a refrigerant pipe 31. The plurality of fins 32 are arranged at predetermined intervals. The refrigerant pipe 31 passes through the plurality of fins 32. The refrigerant pipe 31 is a passage for the refrigerant. The second outdoor heat exchanger refrigerant temperature T14 is, for example, a refrigerant temperature at an inlet 31a of the refrigerant passage in the outdoor heat exchanger 3. The first outdoor heat exchanger refrigerant temperature T13 is, for example, a refrigerant temperature at an outlet 31b of the refrigerant passage in the outdoor heat exchanger 3 and at an intermediate position 31c between the inlet 31a and the outlet 31b of the refrigerant passage.

The outdoor heat exchanger temperature difference-based frost formation determining unit 17-4 first determines whether or not the waiting time period Tx has elapsed from a time at which the number of operating indoor units changes (Step S9-1). When the waiting time period Tx has elapsed, the outdoor heat exchanger temperature difference-based frost formation determining unit 17-4 receives the first outdoor heat exchanger refrigerant temperature T13 measured by the first outdoor heat exchanger refrigerant temperature measuring means 13 through a signal line 28 and stores the received first outdoor heat exchanger refrigerant temperature T13 in the storage unit 17-6 (Step S9-2) Further, the outdoor heat exchanger temperature difference-based frost formation determining unit 17-4 receives the second outdoor heat exchanger refrigerant temperature T14 measured by the second outdoor heat exchanger refrigerant temperature measuring means 14 through a signal line 29 and stores the received second outdoor heat exchanger refrigerant temperature T14 in the storage unit 17-6 (Step S9-3). Then, the outdoor heat exchanger temperature difference-based frost formation determining unit 17-4 calculates a difference Tc (hereinafter referred to as "outdoor heat exchanger temperature difference Tc") between the second outdoor heat exchanger refrigerant temperature T14 and the first outdoor heat exchanger refrigerant temperature T13 and stores the calculated outdoor heat exchanger temperature difference Tc in the storage unit 17-6 (Step S9-4). When the outdoor heat exchanger temperature difference Tc is equal to or lower than a heat exchanger temperature difference threshold value T3 (for example, 20 degrees Celsius), it is determined that the outdoor heat exchanger 3 is frosted and heat exchange performance is lowered (Step S9-5). Specifically, the outdoor heat exchanger temperature difference-based frost formation determining unit 17-4 determines there is the occurrence of frost formation when the difference between the refrigerant temperatures at two locations on the refrigerant passage in the outdoor heat exchanger 3 becomes equal to or smaller than a predetermined threshold value after a heat exchange amount in the outdoor heat exchanger 3 decreases. Alternatively, the occurrence of frost formation may be determined immediately after the outdoor heat exchanger temperature difference Tc becomes equal to or smaller than the heat exchanger temperature difference threshold value T3 or may be determined when a state in which the outdoor heat exchanger temperature difference Tc becomes equal to or smaller than the heat exchanger temperature difference threshold value T3 lasts for a preset time period or longer. Further alternatively, the heat exchanger temperature difference threshold value T3 may be a preset fixed value or may be changed in accordance with the set number of indoor units performing the heating operation. For example, in a case where it is considered that the amount of refrigerant flowing through the refrigerant pipe 31 increases as the number of indoor units performing the heating operation increases to result in a lowered heat exchange efficiency in the outdoor heat exchanger 3, the difference between the first outdoor heat exchanger refrigerant temperature T13 and the second outdoor heat exchanger refrigerant temperature T14 decreases as the number of indoor units performing the heating operation increases. Therefore, the outdoor heat exchanger temperature difference-based frost formation determining unit 17-4 can set the heat exchanger temperature difference threshold value T3 smaller as the number of indoor units performing the heating operation increases. According to the configuration described above, accuracy of the determination of the occurrence of frost formation when the number of indoor units performing the heating operation changes can be further improved.

The measured discharge temperature Td shown in FIG. 16 starts increasing at the operation start time tO to become the target discharge temperature Tdm1 in accordance with three operating indoor units and then decreases greatly to the target discharge temperature Tdm2 in accordance with the number of operating indoor units reduced to two due to the stop of the operation of the indoor unit 120c at the time t2. Then, at the time t4, the measured discharge temperature Td starts gradually decreasing due to the frost formation. The outdoor heat exchanger temperature difference-based frost formation determining unit 17-4 performs the outdoor heat exchanger temperature difference-based frost formation determining processing after the time t3 at which the waiting time period Tx elapses from the time t2. In other words, the outdoor heat exchanger temperature difference-based frost formation determining unit 17-4 does not perform the outdoor heat exchanger temperature difference-based frost formation determining processing until the waiting time period Tx elapses from the time t2. Although the measured discharge temperature Td starts decreasing greatly at the time t2, the outdoor heat exchanger temperature difference-based frost formation determining unit 17-4 does not perform the outdoor heat exchanger temperature difference-based frost formation determining processing during the waiting time period Tx. Therefore, the erroneous detection of the occurrence of frost formation in a case where the number of indoor units performing the heating operation decreases can be prevented. The outdoor heat exchanger temperature difference-based frost formation determining unit 17-4 starts the outdoor heat exchanger temperature difference-based frost-formation determining processing at the time t3 and detects the occurrence of frost formation at the time t5.

The measured discharge temperature Td shown in FIG. 17 starts increasing at the operation start time tO by the start of the heating operation of the indoor units 120a to 120c to become the target discharge temperature Tdm1 in accordance with three operating indoor units. Thereafter, the measured discharge temperature Td greatly decreases to the target discharge temperature Tdm2 in accordance with the number of operating indoor units reduced to two due to the stop of the operation of the indoor unit 120c at the time t21 and then greatly increases to the target discharge temperature Tdm1 in accordance with the number of operating indoor units increased to three due to the restart of the heating operation of the indoor unit 120c at the time t22. At the time t4, the measured discharge temperature Td starts gradually decreasing due to the frost formation. Although the measured discharge temperature Td starts decreasing greatly at the time t21, the outdoor heat exchanger temperature difference-based frost formation determining unit 17-4 does not perform the outdoor heat exchanger temperature difference-based frost formation determining processing during the waiting time period Tx1, specifically, until the time t31. Although the measured discharge temperature Td starts increasing greatly at the time t32, the outdoor heat exchanger temperature difference-based frost formation determining unit 17-4 does not perform the outdoor heat exchanger temperature difference-based frost formation determining processing even during the waiting time period Tx2. When the number of indoor units performing the heating operation changes during the waiting time period Tx1 as described above, the outdoor heat exchanger temperature difference-based frost formation determining unit 17-4 waits for elapse of the waiting time period Tx2 from the time t22 at which the number of indoor units performing the heating operation changes. With the configuration described above, the erroneous detection of the occurrence of frost formation can be prevented in the case where the number of indoor units performing the heating operation decreases. The outdoor heat exchanger temperature difference-based frost formation determining unit 17-4 starts performing the outdoor heat exchanger temperature difference-based frost formation determining processing at the time t32 and detects the occurrence of frost formation at the time t5.

Figure 19:
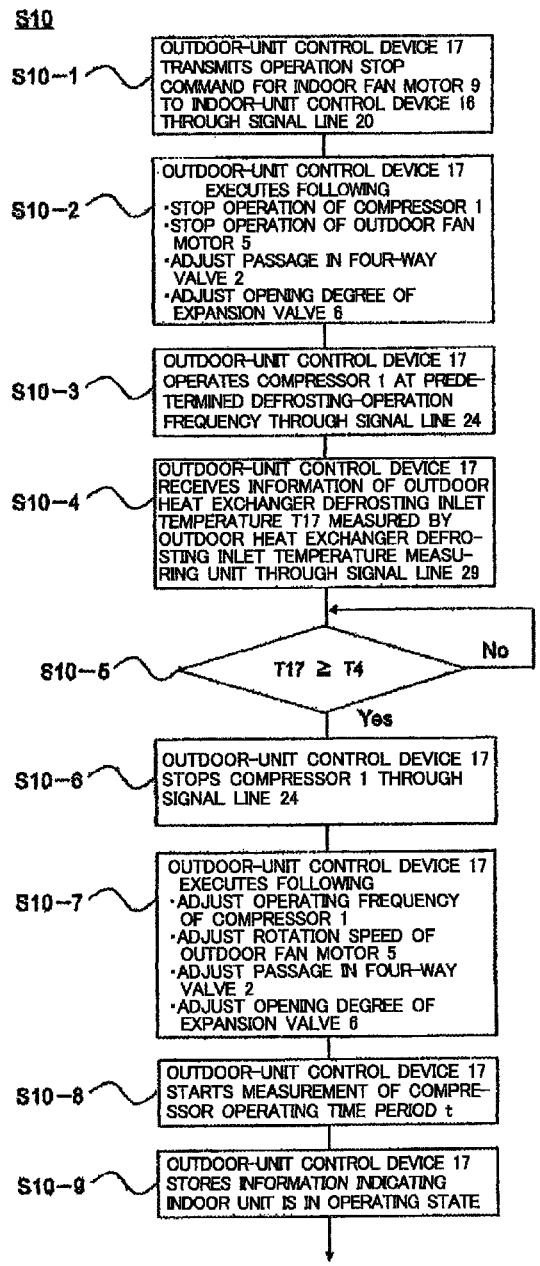
FIG. 19 is a detailed flowchart of defrosting-operation processing (Step S10) illustrated in FIG. 5.

The defrosting operation (Step S10 in FIG. 5) is now described. A detailed flow of the defrosting operation is illustrated in FIG. 19. The operation control unit 17-5 of the outdoor-unit control device 17 transmits an operation stop command for the indoor fan motors 9a to 9c to the indoor-unit control devices 16a to 16c through the wires 20a to 20c (Step S10-1). Further, the operation control unit 17-5 sets the operating frequency of the compressor 1, the rotation speed of the outdoor fan motor 5, and the passage in the four-way valve 2 for the defrosting-operation mode, and sets the opening degree of the expansion valve 6a to such an opening degree as to stop the operation (Step S10-2). The operation control unit 17-5 controls the compressor 1 to operate at a predetermined defrosting-operation frequency through a signal line 24 (Step S10-3). At this time, the passage in the four-way valve 2 is switched to the passage for the cooling operation. The operation control unit 17-5 receives information of an outdoor heat exchanger defrosting inlet temperature T17 through the signal line 29 (Step S10-4). The operation control unit 17-5 determines that the outdoor heat exchanger 3 has been successfully defrosted when the outdoor heat exchanger defrosting inlet temperature T17 is equal to or higher than a preset temperature T4 (Step S10-5). The operation control unit 17-5 stops the compressor through the signal line 24 (Step S10-6). The operation control unit 17-5 sets the operating frequency of the compressor 1, the rotation speed of the outdoor fan motor 5, and the passage in the four-way valve 2 for the heating-operation mode, and opens the expansion valve 6a by a predetermined opening degree (Step S10-7). Further, the operation control unit 17-5 starts measuring the compressor operating time period t again (Step S10-8). The storage unit 17-6 stores information indicating that the indoor unit 120a is in the operating state (Step S10-9).

The outdoor-unit control device 17 can set the operating frequency of the compressor 1 for the defrosting-operation mode in Step S10-3 to a constant value (for example, 80 hertz) regardless of the number of indoor units performing the heating operation. Further, the outdoor-unit control device 17 can also change the operating frequency of the compressor 1 for the defrosting-operation mode in accordance with the number of indoor units performing the heating operation. FIG. 20 shows an example of an operating-frequency table in which the number of indoor units performing the heating operation and the set operating frequency of the compressor during the defrosting operation are correlated with each other. For example, as shown in FIG. 20, the operating frequency of the compressor 1 can be increased as the number of indoor units performing the heating operation increases from one to five and can be then set constant after the number of indoor units performing the heating operation becomes five and more. In FIG. 20, the operating frequency of the compressor 1 is 40 hertz, 60 hertz, 80 hertz, 100 hertz, 120 hertz, and 120 hertz when the number of indoor units performing the heating operation is one, two, three, four, five, and six, respectively. During the heating operation, it is considered that the amount of frost formation on the outdoor heat exchanger 3 increases as the number of indoor units performing the heating operation increases. During the defrosting operation, it is considered that a defrosting speed increases as the operating frequency of the compressor 1 increases. Therefore, as shown in FIG. 20, the operating frequency of the compressor 1 increases from 40 hertz to 120 hertz as the number of indoor units performing the heating operation increases from one to five. By the operation described above, a defrosting time period is prevented from increasing when the number of indoor units performing the heating operation is large. On the other hand, as the number of indoor units performing the heating operation decreases, the operating frequency of the compressor 1 is lowered. When the operating frequency of the compressor 1 is lowered, operation noise of the compressor 1 and power consumption for the operation can be reduced. By the operation described above, the operation noise of the compressor 1 and the power consumption of the compressor 1 during the defrosting operation can be reduced in accordance with the number of indoor units performing the heating operation without increasing the time required for defrosting even when the number of indoor units performing the heating operation is large.

As described above, in the air-conditioning apparatus 100 according to this embodiment, the occurrence of frost formation is determined in three stages. In a first stage, it is determined that the outdoor unit 110 is frosted when the temporal change amount Ta in discharge temperature of the compressor 1 becomes equal to or larger than the preset temperature change amount threshold value T1 after the predetermined time period Tx, Tx1, or Tx2 elapses from the time at which the number of indoor units performing the heating operation changes. In a second stage, it is determined that the outdoor unit 110 is frosted when the difference Tb=Tdm−Td(t) between the discharge temperatures of the compressor 1 becomes equal to or larger than the preset temperature difference threshold value T2 after the predetermined waiting time period Tx, Tx1, or Tx2 elapses from the time at which the number of indoor units performing the heating operation changes. In a third stage, it is determined that the outdoor unit 110 is frosted when the difference Tc between the temperatures at the two locations on the refrigerant passage in the outdoor heat exchanger 3 is equal to or smaller than the preset heat exchanger temperature difference threshold value T3 after the predetermined waiting time period Tx, Tx1, or Tx2 elapses from the time at which the number of indoor units performing the heating operation changes. As described above, by the three-stage determination of occurrence of frost formation, there are provided the effects of preventing the erroneous detection of the occurrence of frost formation due to a change in the number of indoor units performing the heating operation and detecting the occurrence of frost formation when the frost formation actually occurs even in a case where the number of indoor units performing the heating operation decreases. Therefore, according to the air-conditioning apparatus 100 of this embodiment, costs are reduced without using a humidity sensor or a pressure sensor. At the same time, the occurrence of frost formation on the outdoor unit 110 can be precisely determined so as to perform the defrosting operation at an appropriate timing even when the number of indoor units performing the heating operation changes among the indoor units 120a to 120c.

Further, in the air-conditioning apparatus 100 according to this embodiment, it is determined that the frost formation does not occur when the refrigerant temperature at the refrigerant inlet of the outdoor heat exchanger 3 is not lowered to the predetermined temperature T0 (for example, −2 degrees Celsius) or lower. In general, under an environment where an outdoor temperature is low, the frost formation is unlikely to occur. Therefore, when it is considered that the air-conditioning apparatus 100 is present under the environment described above based on the above-mentioned determination, the defrosting operation is not required to be performed. When it is determined that there is no possibility of frost formation as a result of the operation described above, the subsequent specific determination for the occurrence of frost formation (Steps S7 to S9 in FIG. 5) is not required to be performed. An operation efficiency as the entire air-conditioning apparatus 100 can be enhanced by eliminating unnecessary processing. Even when the refrigerant temperature does not decrease to the predetermined temperature T0 or lower, the specific determination for the occurrence of frost formation (Steps S7 to S9 in FIG. 5) may be performed. Specifically, the processing in Step S5 in FIG. 5 can be skipped.

Further, in the air-conditioning apparatus 100 according to this embodiment, the operating frequency of the compressor 1 during the defrosting operation can be changed in accordance with the number of indoor units performing the heating operation. For example, as shown in the operating-frequency table in FIG. 20, the operating frequency of the compressor 1 can be set lower as the number of indoor units performing the heating operation decreases. With the configuration described above, the operation noise of the compressor 1 during the defrosting operation as well as the power consumption can be reduced while ensuring the operating frequency of the compressor, which is required for defrosting.

The example where the three indoor units 120a to 120c are provided has been described in this embodiment, but the number of indoor units is not limited to three and only needs to be two or larger. Further, the example where the discharge-temperature change amount-based frost formation determining processing (Step S7 in FIG. 5), the discharge-temperature difference-based frost formation determining processing (Step S8 in FIG. 5), and the outdoor heat exchanger temperature difference-based frost formation determining processing (Step S9 in FIG. 5) are sequentially executed so that the defrosting operation is performed when the occurrence of frost formation is determined in all of the processing has been described in this embodiment, but the determination of frost formation to perform the defrosting operation is not limited thereto. In the air-conditioning apparatus 100, when the above-mentioned three processing are executed and the occurrence of frost formation is determined in at least one of the processing, the defrosting operation can be performed. Further, in the air-conditioning apparatus 100, only one of the above-mentioned processing can be executed so that the occurrence of frost formation is determined based on the result of determination.

The outdoor heat exchanger temperature difference-based frost formation determining processing (Step S9 in FIG. 5) is based on the assumption that the heat exchange amount in the outdoor heat exchanger 3 is reduced due to the frost formation and the reduction in heat exchange amount is reflected in the temperature difference. When the number of indoor units performing the heating operation decreases, the second outdoor heat exchanger refrigerant temperature T14 and the first outdoor heat exchanger refrigerant temperature T13 both decrease. Therefore, the amount of fluctuation in difference between the second outdoor heat exchanger refrigerant temperature T14 and the first outdoor heat exchanger refrigerant temperature T13 is small. Therefore, the outdoor heat exchanger temperature difference-based frost formation determining unit 17-4 can perform the outdoor heat exchanger temperature difference-based frost formation determining processing without waiting for elapse of the predetermined waiting time period Tx from the time at which the number of indoor units performing the heating operation changes. Even in this case, the erroneous determination of the occurrence of frost formation due to the reduction in the number of indoor units performing the heating operation can be prevented.

Embodiment 2

Now, differences from Embodiment 1 are mainly described.

Figure 21:
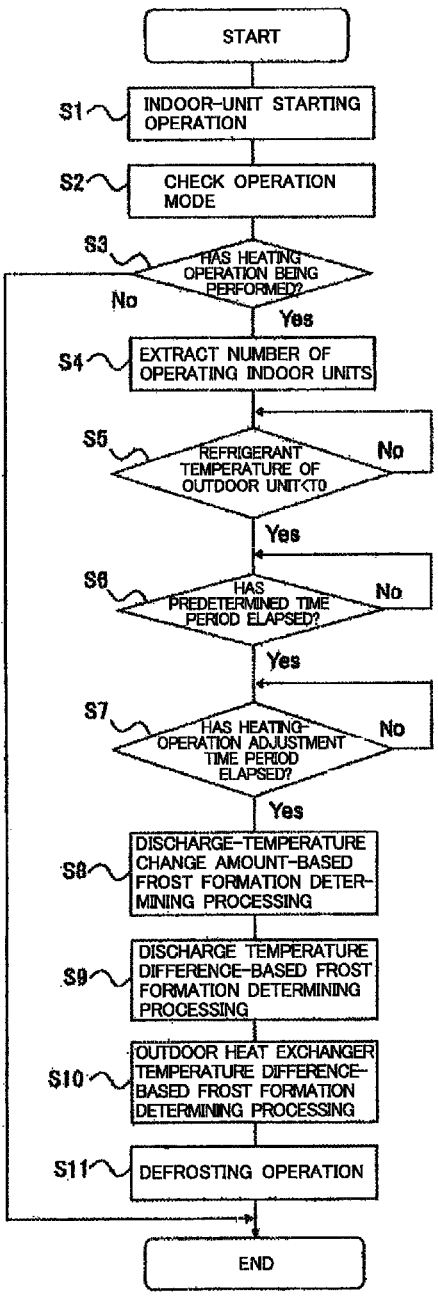
FIG. 21 is a flowchart illustrating a frost-formation determination flow according to Embodiment 2 of the present invention.
Figure 22:
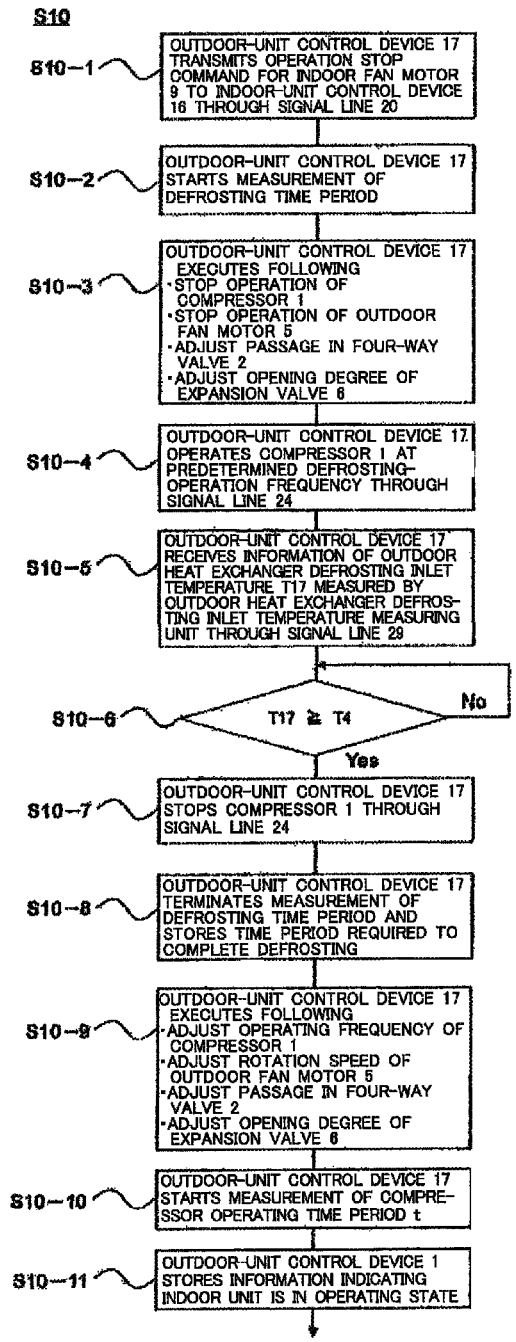
FIG. 22 is a detailed flowchart of defrosting-operation processing (Step S11) illustrated in FIG. 21.

FIG. 21 is a flowchart illustrating a frost-formation determination flow in Embodiment 2 of the present invention. As compared with FIG. 5, which is a corresponding flowchart of Embodiment 1, a step of determination on whether or not a heating-operation adjustment time period has elapsed (Step S7) is added. FIG. 22 is a detailed flowchart of the defrosting-operation processing (Step S11) illustrated in FIG. 21. As compared with FIG. 19, which is a corresponding flowchart of Embodiment 1, Steps S10-2 and S10-8 are added.

The operation control unit 17-5 measures a time period from the defrosting-operation start time to a defrosting-operation completion time, specifically, a time at which the outdoor heat exchanger defrosting inlet temperature T17 becomes equal to or higher than the temperature T4 and stores the measured time period in the storage unit 17-6 (Steps S10-2 and S10-8 in FIG. 22; the time period is hereinafter referred to as "stored defrosting-operation time period").

After elapse of a predetermined defrosting-operation inhibiting time period (for example, thirty minutes) from the heating-operation start time of the indoor units 120a to 120c (Step S6 in FIG. 21), the operation control unit 17-5 determines whether or not the heating-operation adjustment time period has elapsed (Step S7 in FIG. 21).

Figures 23, 24:
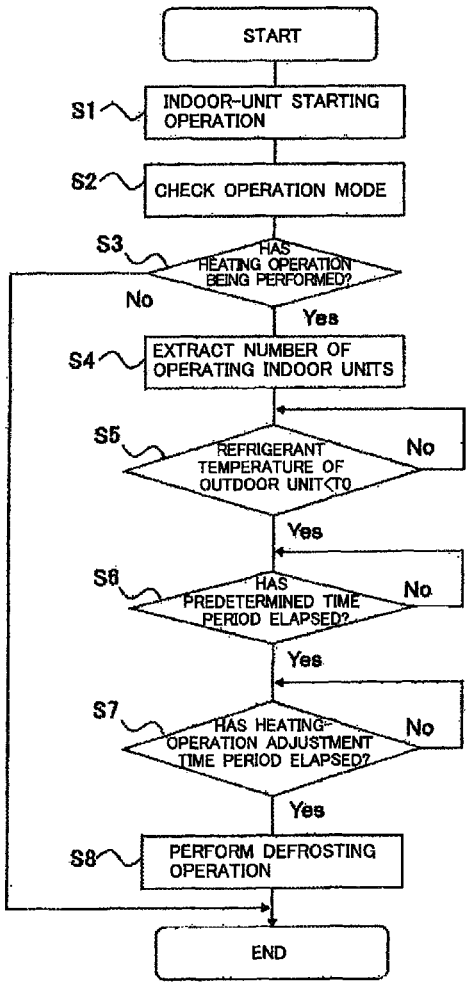
FIG. 23 is an example of a heating-operation adjustment time period table in which a stored defrosting-operation time period, a heating-operation adjustment time period, and correction time for each number of indoor units performing the heating operation are correlated with each other.
FIG. 24 is a flowchart illustrating a frost-formation determination flow according to Embodiment 3 of the present invention.

FIG. 23 is an example of a heating-operation adjustment time period table in which the stored defrosting-operation time period, the heating-operation adjustment time period, and correction time for each number of indoor units performing the heating operation are correlated with each other. A time unit used in FIG. 23 is "minute". The heating-operation adjustment time period is preset in correlation with the stored defrosting-operation time period. In FIG. 23, the heating-operation adjustment time period is +10 minutes, +5 minutes, 0 minutes, −5 minutes, and −10 minutes when the time period required for defrosting is 0 or larger and smaller than 1, 1 or larger and smaller than 2, 2 or larger and smaller than 3, 3 or larger and smaller than 5, and 5 or larger, respectively. When it is determined that there is a possibility of frost formation in Step S5 in FIG. 21, the operation control unit 17-5 controls the indoor units to perform the heating operation until a predetermined defrosting-operation inhibiting time period (for example, 30 minutes) elapses (Step S6). Thereafter, whether or not the heating-operation adjustment time period has elapsed is determined before the specific determination for the occurrence of frost formation (Steps S8 to S10) is performed. In the example illustrated in FIG. 23, for example, when an initial value of the heating-operation adjustment time period is zero minute and the stored defrosting-operation time period is one minute, the operation control unit 17-5 controls the indoor units to perform the heating operation until five minutes of the heating-operation adjustment time period further elapses after the elapse of thirty minutes of the defrosting-operation inhibiting time period. Specifically, the operation control unit 17-5 performs the specific determination for the occurrence of frost formation (Steps S8 to S10) after the heating operation is performed for thirty-five minutes in total. At this time, the operation control unit 17-5 can correct the heating-operation adjustment time period in accordance with the number of indoor units performing the heating operation. For example, in the case of the example illustrated in FIG. 23, when the number of indoor units performing the heating operation is one at the time when the predetermined defrosting-operating inhibiting time period elapses, the operation control unit 17-5 extends the heating-operation adjustment time period by another four minutes to set the heating-operation adjustment time period to nine minutes in total. In this manner, after the heating operation for thirty-nine minutes in total, the operation control unit 17-5 can perform the specific determination for frost formation (Steps S8 to S10). For next setting of the heating-operation adjustment time period, the operation control unit 17-5 can set 0 minutes, which is the initial value of the heating-operation adjustment time period, as a reference as in the case described above or can also set the next heating-operation adjustment time period in the following manner. Specifically, the operation control unit 17-5 can store the previously set heating-operation adjustment time period in the storage unit 17-6 and set the next heating-operation adjustment time period using the stored heating-operation adjustment time period as a reference. For example, the following case is assumed. After the heating-operation adjustment time period is set to nine minutes by the adjustment described above, the determination for the occurrence of frost formation (Steps S8 to S10) is performed and then the defrosting operation is performed (Step S11). A time period required for defrosting is three minutes. In this case, the stored defrosting-operation time period is three minutes. In the case of the example shown in FIG. 23, for example, after the defrosting-operation inhibiting time period of thirty minutes elapses, the operation control unit 17-5 performs the heating operation until the heating-operation adjustment time period of nine minutes−five minutes=four minutes further elapses. Further, if the time period required for defrosting is five minutes, the same calculation as that described above is performed. Then, nine minutes–ten minutes=−one minute is obtained. In this case, assuming that the heating-operation adjustment time period is zero minute, the defrosting-operation inhibiting time period of thirty minutes is ensured. Specifically, after the defrosting-operation inhibiting time period of, for example, thirty minutes elapses, the operation control unit 17-5 proceeds the processing to specific determination steps for the occurrence of frost formation (Steps S8 to S10) without additionally performing the heating operation.

As described above, in this embodiment, the time period required for defrosting is stored. In accordance with the stored time period, the subsequent heating-operation time period before the determination for the occurrence of frost formation is adjusted. For example, as shown in FIG. 23, when the time period required for defrosting is short (specifically, under conditions where the amount of frost formation is small), the heating-operation time period is increased. On the other hand, when the time period required for defrosting is long (specifically, under conditions where the amount of frost formation is large), the heating-operation time period is reduced while ensuring the predetermined defrosting-operation inhibiting time period. According to the configuration described above, the heating-operation time period before a transition to the defrosting operation is increased under the conditions where the amount of frost formation is small so that the indoor temperature can be increased. In this manner, the amount of reduction in room temperature, which is caused along with the defrosting operation, can be reduced. On the other hand, the heating-operation time period before the transition to the defrosting operation is reduced under the conditions where the amount of frost formation is large so that the operation can transition to the defrosting operation at early time. In this manner, the amount of reduction in heat exchange efficiency due to the frost formation can be reduced. The processing described above is processing for estimating an operating environment from the time period required for defrosting and ensuring an appropriate heating-operation time period in accordance with the estimated operating environment for a subsequent defrosting operation. Thus, it can be said that the above-mentioned processing has a learning function for the defrosting operation and the heating operation. The conditions where the amount of frost formation is small include, for example, the installation of the air-conditioning apparatus 100 in a low-humidity area and the defrosting operation performed in a low-humidity season. On the other hand, the conditions where the amount of frost formation is large include, for example, the installation of the air-conditioning apparatus 100 in a high-humidity area and the defrosting operation performed in a high-humidity season.

Although the example where the heating-operation adjustment time period is corrected in accordance with the number of indoor units performing the heating operation has been described in this embodiment, the above-mentioned correction may be omitted. Specifically, the operation control unit 17-5 can select the heating-operation adjustment time period corresponding to the stored defrosting-operation time period. After elapse of the predetermined defrosting-operation inhibiting time period, the heating operation is additionally performed for the selected heating-operation adjustment time period. Then, the specific determination for the occurrence of frost formation (Steps S8 to S10) can be performed. The times shown in FIG. 23 are merely examples, and the times are not limited thereto. Further, although the example where the processing for adjusting the heating-operation time period before the determination of the occurrence of frost formation (Step S7 in FIG. 21) and the processing for changing the operating frequency of the compressor 1 during the defrosting operation in accordance with the number of indoor units performing the heating operation (Step S10-4 in FIG. 22) are both executed has been described in this embodiment, the processing is not limited thereto. Specifically, the operating frequency of the compressor 1 may be set to a constant value in Step S10-4 in FIG. 22 after the processing in Step S7 in FIG. 21 is executed. Alternatively, in Step S10-4 in FIG. 22, the operating frequency of the compressor 1 may be changed in accordance with the number of indoor units performing the heating operation during the heating operation without executing the processing in Step S7 in FIG. 21.

Embodiment 3

Figure 25:
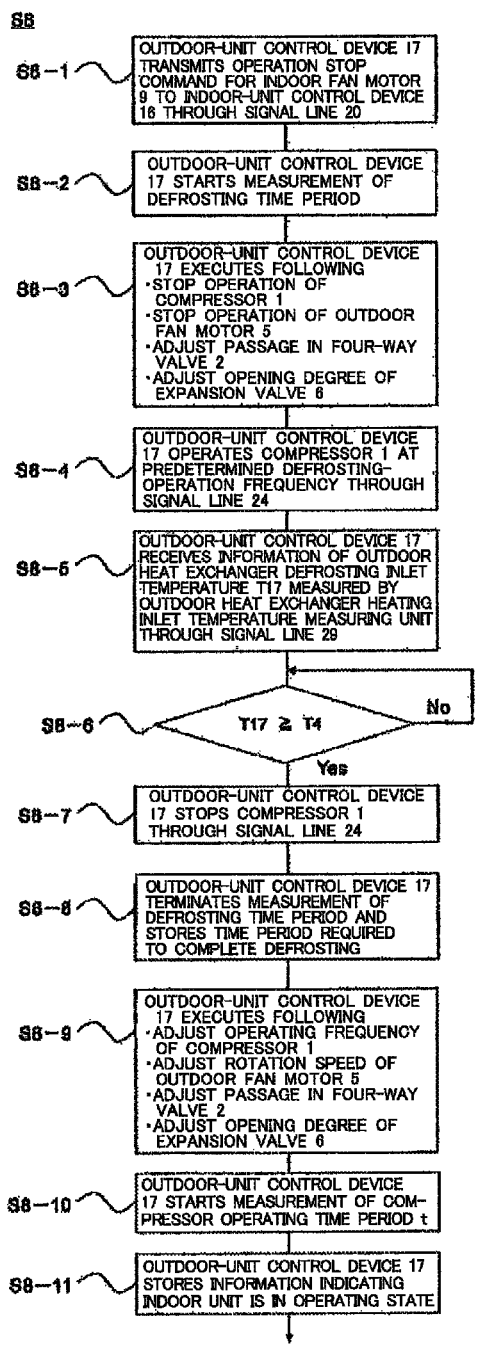
FIG. 25 is a detailed flowchart of defrosting-operation processing (Step S8) illustrated in FIG. 24.

FIG. 24 is a flowchart illustrating a frost-formation determination flow according to Embodiment 3 of the present invention. The frost-formation determination flow in FIG. 24 does not include Steps S8 to S10 in FIG. 21 that illustrates the frost-formation determination flow of Embodiment 2. FIG. 25 is a detailed flowchart of the defrosting-operation processing (Step S8) in FIG. 24. A configuration of the air-conditioning apparatus 100 according to Embodiment 3 is illustrated in FIG. 1, a configuration of each of the indoor-unit control devices 16a to 16c is illustrated in FIG. 2, a configuration of the outdoor-unit control device is illustrated in FIG. 3, and the relationship between the number of indoor units performing the heating operation and the target discharge temperature is shown in FIG. 4.

Frost-formation determining processing performed by the air-conditioning apparatus 100 according to this embodiment is now described.

First, when the operation starting operation for the indoor unit 120a is performed by using the remote controller 18a, the indoor-unit control device 16a of the indoor unit 120a starts the indoor-unit starting operation processing (Step S1). A detailed flow of the indoor-unit starting operation processing is illustrated in FIG. 6. When an operation button of the remote controller 18a is pressed, the indoor-unit control device 16a receives the operation start command through the wiring 19a (Step S1-1). Communication through the wiring 19a may be wired or wireless. The indoor-unit control device 16a operates the indoor fan motor 9a at the predetermined rotation speed through the wiring 22a (Step S1-2) and transmits the operation command together with the operation control information to the outdoor-unit control device 17 through the wiring 20a to notify that the indoor unit 120a has started the operation (Step S1-3).

The operation control unit 17-5 performs the operation-mode check processing (Step S2 in FIG. 5) in accordance with the operation command. A detailed flow of the operation-mode check processing is illustrated in FIG. 7. When the operation control unit 17-5 receives the operation command through the wiring 20a, the storage unit 17-6 stores the operation mode of the indoor unit that transmits the operation command (Step S2-1). In this case, it is assumed that the indoor unit that transmits the operation mode is the indoor unit 120a and the operation mode of the indoor unit 120a is the heating-operation mode. The operation command includes information indicating that the operation mode of the indoor unit 120a is the heating-operation mode. The operation control unit 17-5 recognizes that the indoor unit 120a has started the heating operation, sets the operating frequency of the compressor 1, the rotation speed of the indoor fan motor 5, and the passage in the four-way valve 2 for the heating-operation mode, and opens the expansion valve 6a by the predetermined opening degree (Step S2-2). Further, the operation control unit 17-5 starts measuring the operating time period t of the compressor 1 (Step S2-3). Further, the storage unit 17-6 stores information indicating the indoor unit 120a is in the operating state (Step S2-4). When the operation mode of the indoor unit 120a is the cooling-operation mode, the above-mentioned processing flow is terminated (Step S3).

Next, the unit 17-1 for determining the number of indoor units performing heating operation of the indoor-unit control device 17 performs the processing for determining the number of indoor units performing the heating operation (Step S4 in FIG. 5). A detailed flow of the processing for determining the number of indoor units performing the heating operation is illustrated in FIG. 8. The unit 17-1 for determining the number of indoor units performing heating operation determines the number of indoor units performing the heating operation (hereinafter referred to as "operating indoor units") based on the operation mode of each of the indoor units 120a to 120c, which is stored in the storage unit 17-6 (Step S4-1). Then, the unit 17-1 for determining the number of indoor units performing heating operation sets an appropriate discharge temperature in accordance with the number of operating indoor units as the target discharge temperature Tdm and stores the thus set target discharge temperature Tdm in the storage unit 17-6 (Step S4-2). Further, the unit 17-1 for determining the number of indoor units performing heating operation adjusts the operating frequency of the compressor 1 so that the discharge temperature Td becomes closer to the set target discharge temperature Tdm (Step S4-3).

Next, the operation control unit 17-5 of the outdoor-unit control device 17 determines whether or not the refrigerant temperature measured by the second outdoor heat exchanger refrigerant temperature measuring means 14 is equal to or lower than the preset temperature T0 (Step S5). The temperature T0 is the threshold temperature for determining whether or not there is a possibility of frost formation on the outdoor heat exchanger 3. The operation control unit 17-5 determines that there is a possibility of frost formation when the measured refrigerant temperature is equal to or lower than the temperature T0. Therefore, the processing proceeds to subsequent Step S6. Specifically, if the outdoor heat exchanger 3 is not frosted to gradually lower the refrigerant temperature so that the refrigerant temperature at the refrigerant inlet of the outdoor heat exchanger 3 becomes equal to or lower than the temperature T0, the defrosting operation is not performed. The temperature T0 is, for example, −2 degrees Celsius.

The operation control unit 17-5 determines whether or not the preset time period t1 has elapsed from the operation start time t0 (Step S6). When the time period t1 (for example, thirty minutes) that is the predetermined defrosting-operation inhibiting time period has not elapsed from the heating-operation start time of the indoor units 120a to 120c, the operation control unit 17-5 continues the operation until the predetermined time period t1 elapses.

The operation control unit 17-5 sets the heating-operation adjustment time period based on the defrosting time period measured in the defrosting-operation processing (Step S8) at the time of the previous defrosting. FIG. 23 is an example of a heating-operation adjustment time period table in which the stored defrosting-operation time period, the heating-operation adjustment time period, and correction time for each number of indoor units performing the heating operation are correlated with each other. A time unit used in FIG. 23 is "minute". The heating-operation adjustment time period is preset in correlation with the stored defrosting-operation time period. In FIG. 23, the heating-operation adjustment time period is +10 minutes, +5 minutes, 0 minutes, −5 minutes, and −10 minutes when the time period required for defrosting is 0 or larger and smaller than 1, 1 or larger and smaller than 2, 2 or larger and smaller than 3, 3 or larger and smaller than 5, and 5 or larger, respectively. In the example illustrated in FIG. 23, for example, when an initial value of the heating-operation adjustment time period is zero minute and the stored defrosting-operation time period at a time of pervious defrosting is one minute, the operation control unit 17-5 sets the heating-operation adjustment time period to five minutes. Specifically, the operation control unit 17-5 controls the indoor units to perform another five minutes of the heating operation after the elapse of, for example, thirty minutes of the defrosting-operation inhibiting time period has elapsed. Specifically, the operation control unit 17-5 performs the defrosting operation after the heating operation is performed for thirty-five minutes in total (Step S8). At this time, the operation control unit 17-5 can correct the heating-operation adjustment time period in accordance with the number of indoor units performing the heating operation. For example, in the case of the example illustrated in FIG. 23, when the number of indoor units performing the heating operation is one at the time when the predetermined defrosting-operating inhibiting time period elapses, the operation control unit 17-5 extends the heating-operation adjustment time period by another four minutes to set the heating-operation adjustment time period to nine minutes in total. In this manner, after the heating operation for thirty-nine minutes in total, the operation control unit 17-5 can perform the defrosting operation (Step S8). For next setting of the heating-operation adjustment time period, the operation control unit 17-5 can set 0 minutes, which is the initial value of the heating-operation adjustment time period, as a reference as in the case described above or can also set the next heating-operation adjustment time period in the following manner. Specifically, the operation control unit 17-5 can store the previously set heating-operation adjustment time period in the storage unit 17-6 and set the next heating-operation adjustment time period using the stored heating-operation adjustment time period as a reference. For example, the following case is assumed. After the heating-operation adjustment time period is set to nine minutes by the adjustment described above, the defrosting operation is performed (Step S8). A time period required for defrosting is three minutes. In this case, the stored defrosting-operation time period is three minutes. In the case of the example shown in FIG. 23, for example, after the defrosting-operation inhibiting time period of thirty minutes elapses, the operation control unit 17-5 performs the heating operation until the heating-operation adjustment time period of nine minutes−five minutes=four minutes further elapses. Further, if the time period required for defrosting is five minutes, the same calculation as that described above is performed. Then, nine minutes−ten minutes=−one minute is obtained. In this case, assuming that the heating-operation adjustment time period is zero minute, the defrosting-operation inhibiting time period of thirty minutes is ensured. Specifically, after the defrosting-operation inhibiting time period of, for example, thirty minutes elapses, the operation control unit 17-5 proceeds the processing to the defrosting-operation processing (Step S8) without additionally performing the heating operation. As described above, when it is determined that there is a possibility of frost formation in Step S5 in FIG. 24, the operation control unit 17-5 sets the heating-operation adjustment time period based on the defrosting time period measured in the defrosting-operation processing (Step S8) at the time of previous defrosting and controls the indoor units to perform the heating operation until the predetermined defrosting-operation inhibiting time period (for example, thirty minutes) elapses (Step S6). Thereafter, before the defrosting operation (Step S8) is performed, the operation control unit 17-5 determines whether or not the heating-operation adjustment time period has elapsed (Step S7). When the heating-operation adjustment time period has not elapsed, the operation control unit 17-5 controls the indoor units to perform the heating operation until the heating-operation adjustment time period elapses. When the operation control unit 17-5 determines that the heating-operation adjustment time period has elapsed, the processing proceeds to the defrosting-operation processing (Step S8).

The defrosting operation in FIG. 24 (Step S8) is now described. A detailed flow of the defrosting operation is illustrated in FIG. 25. The operation control unit 17-5 of the outdoor-unit control device 17 transmits the operation stop command for the indoor fan motors 9a to 9c to the indoor-unit control devices 16a to 16c through the wires 20a to 20c (Step S8-1). The operation control unit 17-5 starts measuring the defrosting time period (S8-2). Further, the operation control unit 17-5 sets the operating frequency of the compressor 1, the rotation speed of the outdoor fan motor 5, and the passage in the four-way valve 2 for the defrosting-operation mode, and sets the opening degree of the expansion valve 6a to such an opening degree as to stop the operation (Step S8-3). The operation control unit 17-5 controls the compressor 1 to operate at the predetermined defrosting-operation frequency through the signal line 24 (Step S8-4). At this time, the passage in the four-way valve 2 is switched to the passage for the cooling operation. The operation control unit 17-5 receives the information of the outdoor heat exchanger defrosting inlet temperature T17 through the signal line 29 (Step S8-5). The operation control unit 17-5 determines that the outdoor heat exchanger 3 has been successfully defrosted when the outdoor heat exchanger defrosting inlet temperature T17 is equal to or higher than the preset temperature T4 (Step S8-6). Next, the operation control unit 17-5 stops the compressor 1 through the signal line 24 (Step S8-7). The operation control unit 17-5 terminates the measurement of the defrosting time period. Then, the operation control unit 17-5 measures a time period from the defrosting-operation start time to the defrosting-operation completion time, that is, the time at which the outdoor heat exchanger defrosting inlet temperature T17 becomes equal to or higher than the temperature T4 and stores the thus measured time period in the storage unit 17-6 (Step S8-8). The time period is referred to as "stored defrosting-operation time period". The operation control unit 17-5 sets the operating frequency of the compressor 1, the rotation speed of the outdoor fan motor 5, and the passage in the four-way valve 2 for the heating-operation mode, and opens the expansion valve 6a by a predetermined opening degree (Step S8-9). Further, the operation control unit 17-5 starts measuring the compressor operating time period t again (Step S8-10). The storage unit 17-6 stores information indicating that the indoor unit 120a is in the operating state (Step S8-11).

The outdoor-unit control device 17 can set the operating frequency of the compressor 1 for the defrosting-operation mode in Step S8-4 to a constant value (for example, 80 hertz) regardless of the number of indoor units performing the heating operation. Further, the outdoor-unit control device 17 can also change the operating frequency of the compressor 1 for the defrosting-operation mode in accordance with the number of indoor units performing the heating operation. FIG. 20 shows the example of the operating-frequency table in which the number of indoor units performing the heating operation and the set operating frequency of the compressor during the defrosting operation are correlated with each other. For example, as shown in FIG. 20, the operating frequency of the compressor 1 can be increased as the number of indoor units performing the heating operation increases from one to five and can be then set constant after the number of indoor units performing the heating operation becomes five and more. In FIG. 20, the operating frequency of the compressor 1 is 40 hertz, 60 hertz, 80 hertz, 100 hertz, 120 hertz, and 120 hertz when the number of indoor units performing the heating operation is one, two, three, four, five, and six, respectively. During the heating operation, it is considered that the amount of frost formation on the outdoor heat exchanger 3 increases as the number of indoor units performing the heating operation increases. During the defrosting operation, it is considered that a defrosting speed increases as the operating frequency of the compressor 1 increases. Therefore, as shown in FIG. 20, the operating frequency of the compressor 1 increases from 40 hertz to 120 hertz as the number of indoor units performing the heating operation increases from one to five. By the operation described above, the defrosting time period is prevented from increasing when the number of indoor units performing the heating operation is large. On the other hand, as the number of indoor units performing the heating operation decreases, the operating frequency of the compressor 1 is lowered. When the operating frequency of the compressor 1 is lowered, the operation noise of the compressor 1 and the power consumption for the operation can be reduced. By the operation described above, the operation noise of the compressor 1 and the power consumption of the compressor 1 during the defrosting operation can be reduced in accordance with the number of indoor units performing the heating operation without increasing the time period required for defrosting even when the number of indoor units performing the heating operation is large.

As described above, in this embodiment, the time period required for defrosting is stored. In accordance with the stored time period, the subsequent heating-operation time period before the determination for the occurrence of frost formation is adjusted. For example, as shown in FIG. 23, when the time period required for defrosting is short (specifically, under conditions where the amount of frost formation is small), the heating-operation time period is increased. On the other hand, when the time period required for defrosting is long (specifically, under conditions where the amount of frost formation is large), the heating-operation time period is reduced while ensuring the predetermined defrosting-operation inhibiting time period. According to the configuration described above, the heating-operation time period before the transition to the defrosting operation is increased under the conditions where the amount of frost formation is small so that the indoor temperature can be increased. In this manner, the amount of reduction in room temperature, which is caused along with the defrosting operation, can be reduced. On the other hand, the heating-operation time period before the transition to the defrosting operation is reduced under the conditions where the amount of frost formation is large so that the operation can transition to the defrosting operation at early time. In this manner, the amount of reduction in heat exchange efficiency due to the frost formation can be reduced. The processing described above is processing for estimating an operating environment from the time period required for defrosting and ensuring an appropriate heating-operation time period in accordance with the estimated operating environment for the subsequent defrosting operation. Thus, it can be said that the above-mentioned processing has a learning function for the defrosting operation and the heating operation. The conditions where the amount of frost formation is small include, for example, the installation of the air-conditioning apparatus 100 in a low-humidity area and the defrosting operation performed in a low-humidity season. On the other hand, the conditions where the amount of frost formation is large include, for example, the installation of the air-conditioning apparatus 100 in a high-humidity area and the defrosting operation performed in a high-humidity season.

Further, in the air-conditioning apparatus 100 according to this embodiment, it is determined that the frost formation does not occur when the refrigerant temperature at the refrigerant inlet of the outdoor heat exchanger 3 is not lowered to the predetermined temperature T0 (for example, −2 degrees Celsius) or lower. In general, under the environment where the outdoor temperature is low, the frost formation is unlikely to occur. Therefore, when it is considered that the air-conditioning apparatus 100 is present under the environment described above based on the above-mentioned determination, the defrosting operation is not required to be performed. When it is determined that there is no possibility of the frost formation as a result of the operation described above, the defrosting operation (Step S8) is not performed. By the elimination of the unnecessary defrosting operation, the room temperature can be prevented from being excessively lowered. Further, in the air-conditioning apparatus 100 according to Embodiment 3, the operating frequency of the compressor 1 during the defrosting operation can be changed in accordance with the number of indoor units performing the heating operation. For example, as shown in the operating-frequency table in FIG. 20, as the number of indoor units performing the heating operation decreases, the operating frequency of the compressor 1 can be lowered. With the configuration described above, the operation noise of the compressor 1 during the defrosting operation as well as the power consumption can be reduced while the operating frequency of the compressor, which is required for defrosting, is ensured.

Although the description has been made for the example where the processing for adjusting the heating-operation time period before the determination of the occurrence of frost formation (Step S7 in FIG. 24) and the processing for changing the operating frequency of the compressor 1 during the defrosting operation in accordance with the number of indoor units performing the heating operation during the heating operation (Step S8-4 in FIG. 25) are both executed, the processing in this embodiment is not limited thereto. Specifically, the operating frequency of the compressor 1 can be set to a constant value in Step S8-4 in FIG. 25 after Step S7 in FIG. 24 is executed. Alternatively, the operating frequency of the compressor 1 can be changed in accordance with the number of indoor units performing the heating operation during the heating operation in Step S8-4 in FIG. 25 without executing Step S7 in FIG. 24.

Although the example where the heating-operation adjustment time period is corrected in accordance with the number of indoor units performing the heating operation has been described in this embodiment, the above-mentioned correction may be omitted. Specifically, the operation control unit 17-5 can select the heating-operation adjustment time period corresponding to the stored defrosting-operation time period. After elapse of the predetermined defrosting-operation inhibiting time period, the heating operation is additionally performed for the selected heating-operation adjustment time period. Then, the defrosting operation (Step S8) can be performed. The times shown in FIG. 23 are merely examples, and the times are not limited thereto.

Embodiment 4

Figure 26:
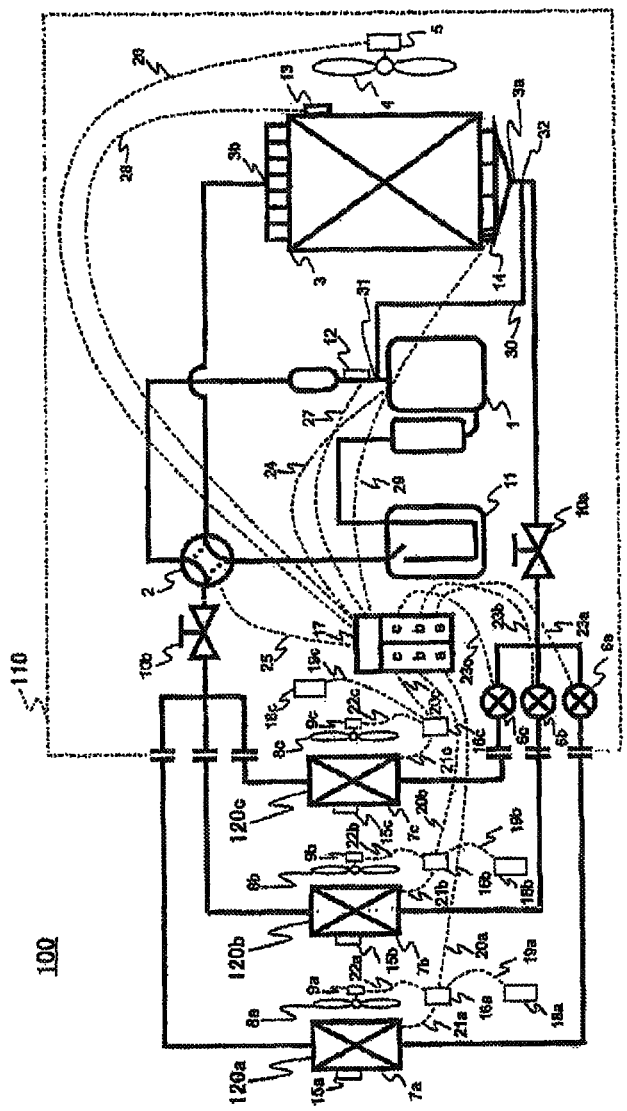
FIG. 26 is a diagram illustrating a configuration of an air-conditioning apparatus according to Embodiment 4 of the present invention.

Now, differences from Embodiments 1 to 3 are mainly described. A configuration of an air-conditioning apparatus 100 according to Embodiment 4 is illustrated in FIG. 26. In Embodiment 1, the example where the four-way valve 2 is switched at the transition to the defrosting operation has been described. On the other hand, in Embodiment 4, a bypass pipe 30 is provided between a discharge port 31 of the compressor 1 and a refrigerant flow inlet 32 of the outdoor heat exchanger 3. The operation control unit 17-5 interrupts a flow of a high-temperature gas refrigerant from the discharge port 31 of the compressor 1 to the bypass pipe 30 during the heating operation and controls the high-temperature gas refrigerant to flow from the discharge port 31 of the compressor 1 to the bypass pipe 30 during the defrosting operation. The high-temperature gas refrigerant discharged from the compressor 1 flows into the outdoor heat exchanger 3 through the bypass pipe 30. According to the configuration described above, the defrosting operation can be performed without switching the four-way valve 2 or without providing the four-way valve 2 in the outdoor unit 110. As a matter of course, the erroneous detection of the occurrence of frost formation in a case where the number of indoor units performing the heating operation changes can be prevented and the frost formation can be detected when the frost formation actually occurs, as in the case of Embodiment 1. The same configuration including the bypass pipe 30 can be realized even in Embodiment 2, and the same effects can be provided thereby.

Reference Signs List

| | | | | | |
|---|---|---|---|---|---|
| 1 | compressor | 2 | four-way valve | 3 | outdoor heat exchanger |
| 4 | outdoor fan | 5 | outdoor fan motor | 6a to 6c | expansion valve |
| 7a to 7c | indoor heat exchanger | | | 8a to 8c indoor fan 9a to 9c indoor fan motor | |
| | | 10a, 10b | valve | 11 | liquid reservoir 12 discharge-temperature measuring means |
| | | | | 13 | first outdoor heat exchanger refrigerant temperature measuring means 14 second outdoor heat exchanger refrigerant temperature measuring means 15a to 15c indoor heat exchanger refrigerant temperature measuring means 16a to 16c indoor-unit control device 16a-1 receiving unit 16a-2 operating-state notifying unit 16a-3 operation control unit 16a-4 storage unit 17 outdoor-unit control device 17-1 unit for determining number of indoor units performing heating operation 17-2 discharge-temperature change amount-based frost formation determining unit 17-3 discharge-temperature difference-based frost formation determining unit 17-4 outdoor heat exchanger temperature difference-based frost formation determining unit |

| 17-5 | operation control unit | 17-6 | storage unit | 18a to 18c | air-conditioning apparatus |
| remote controller | | 19a to 29 | wiring | 100 | |
| 110 | outdoor unit | 120a to 120c | indoor unit | 30 | bypass pipe |

The invention claimed is:

1. An air-conditioning apparatus, comprising:
a plurality of indoor units; and
an outdoor unit comprising:
 an outdoor heat exchanger for exchanging heat between refrigerant delivered from the plurality of indoor units and outdoor air; and
 a compressor for compressing the refrigerant output from the outdoor heat exchanger so as to deliver the compressed refrigerant to the plurality of indoor units,
the plurality of indoor units each comprising an operating-state notifying unit for transmitting operating-state information indicating that a heating operation is being performed to the outdoor unit,
the outdoor unit comprising:
 a frost-formation determining unit for determining a number of the indoor units performing the heating operation based on the operating-state information and determining whether there is occurrence of frost formation on the outdoor heat exchanger after elapse of a preset time period from a time at which the number of the indoor units performing the heating operation changes; and
 an operation control unit for performing a defrosting operation when the frost-formation determining unit determines there is the occurrence of the frost formation,
wherein the frost-formation determining unit comprises a discharge-temperature difference determining unit for setting a target discharge temperature in accordance with the number of the indoor units performing the heating operation, starting a determination on whether or not a difference between a measured discharge temperature obtained by measuring a refrigerant discharge temperature of the compressor and the target discharge temperature is equal to or larger than a second threshold value after the elapse of the preset time period, and determining the occurrence of the frost formation on the outdoor heat exchanger when the difference is equal to or larger than the second threshold value.

2. The air-conditioning apparatus of claim 1, wherein the frost-formation determining unit comprises a discharge-temperature change amount determining unit for starting a determination on whether or not a temporal change amount of the refrigerant discharge temperature of the compressor is equal to or larger than a preset first threshold value after the elapse of the preset time period and determining the occurrence of the frost formation on the outdoor heat exchanger when determining that the temporal change amount of the refrigerant discharge temperature of the compressor is equal to or larger than the preset first threshold value.

3. The air-conditioning apparatus of claim 1, wherein the target discharge temperature is set so as to increase in a stepwise manner until the number of the indoor units performing the heating operation reaches a preset number, and so as to be prevented from increasing when the number of the indoor units performing the heating operation is equal to or larger than the preset number.

4. The air-conditioning apparatus of claim 1, wherein the frost-formation determining unit comprises an outdoor heat exchanger temperature difference determining unit for starting a determination on whether or not a difference between refrigerant temperatures at two temperature measurement locations on a refrigerant passage in the outdoor heat exchanger is equal to or smaller than a preset third threshold value after the elapse of the preset time period and determining the occurrence of the frost formation on the outdoor heat exchanger when the difference is equal to or smaller than the preset third threshold value.

5. The air-conditioning apparatus of claim 4, wherein the two temperature measurement locations comprise one of a combination of a position of an inlet and a position of an outlet of the refrigerant passage and a combination of the position of the inlet of the refrigerant passage and an intermediate position between the inlet and the outlet.

6. The air-conditioning apparatus of claim 4, wherein the outdoor heat exchanger temperature difference determining unit changes the preset third threshold value in accordance with the number of the indoor units performing the heating operation.

7. The air-conditioning apparatus of claim 6, wherein the preset third threshold value decreases as the number of the indoor units performing the heating operation increases.

8. An air-conditioning apparatus of claim 4, wherein the outdoor heat exchanger temperature difference determining unit determines there is the occurrence of the frost formation when a time period over which the difference between the refrigerant temperatures is equal to or smaller than the preset third threshold value lasts for a longer time period than a preset time period.

9. The air-conditioning apparatus of claim 1, wherein the operating-state information comprises information indicating that each of the plurality of indoor units is in any one of a heating-operation state, a cooling-operation state, and a stopped state.

10. The air-conditioning apparatus of claim 1, further comprising refrigerant-temperature measuring unit for measuring a refrigerant temperature in the outdoor heat exchanger,
wherein the frost-formation determining unit determines whether or not the frost formation occurs when the refrigerant temperature measured by the refrigerant-temperature measuring unit is equal to or lower than a preset threshold temperature.

11. The air-conditioning apparatus of claim 1, wherein the operation control unit changes an operating frequency of the compressor during the defrosting operation in accordance with the number of the indoor units performing the heating operation immediately before a transition to the defrosting operation.

12. The air-conditioning apparatus of claim 11, wherein the operating frequency is set so as to decrease as the number of the indoor units performing the heating operation immediately before the transition to the defrosting operation decreases.

13. The air-conditioning apparatus of claim 1, further comprising:

a time measuring unit for measuring a time period required for defrosting; and a storage unit for storing the time period measured by the time measuring means, wherein the operation control unit changes a heating-operation time period immediately before the transition to the defrosting operation in accordance with a length of the time period stored in the storage unit.

14. The air-conditioning apparatus of claim 13, wherein the heating-operation time period immediately before the transition to the defrosting operation increases as the time period required for the defrosting decreases.

15. The air-conditioning apparatus of claim 13, wherein the heating-operation time period immediately before the transition to the defrosting operation comprises a time period obtained by a correction for increasing the heating-operation time period immediately before the transition to the defrosting operation as the number of the indoor units performing the heating operation immediately before the transition to the defrosting operation decreases.

16. The air-conditioning apparatus of claim 1, further comprising a bypass pipe connected between a discharge port of the compressor and an inlet of a refrigerant passage in the outdoor heat exchanger, wherein the defrosting operation is performed when the operation control unit allows the refrigerant to flow from the discharge port of the compressor to the bypass pipe in a case where the frost-formation determining unit determines there is the occurrence of the frost formation on the outdoor heat exchanger.

17. An air-conditioning apparatus, comprising:

a plurality of indoor units; and an outdoor unit comprising:

an outdoor heat exchanger for exchanging heat between refrigerant delivered from the plurality of indoor units and outdoor air; and a compressor for compressing the refrigerant output from the outdoor heat exchanger so as to deliver the compressed refrigerant to the plurality of indoor units, the plurality of indoor units each comprising an operating-state notifying unit for transmitting operating-state information indicating that a heating operation is being performed to the outdoor unit, the outdoor unit comprising:

a frost-formation determining unit for determining a number of the indoor units performing the heating operation based on the operating-state information and determining whether there is occurrence of frost formation on the outdoor heat exchanger after elapse of a preset time period from a time at which the number of the indoor units performing the heating operation changes; and an operation control unit for performing a defrosting operation when the frost-formation determining unit determines there is the occurrence of the frost formation, wherein the frost-formation determining unit comprises an outdoor heat exchanger temperature difference determining unit for starting a determination on whether or not a difference between refrigerant temperatures at two temperature measurement locations on a refrigerant passage in the outdoor heat exchanger is equal to or smaller than a preset third threshold value after the elapse of the preset time period and determining the occurrence of the frost formation on the outdoor heat exchanger when the difference is equal to or smaller than the preset third threshold value.

18. The air-conditioning apparatus of claim 17, wherein the frost-formation determining unit further comprises a discharge-temperature change amount determining unit for starting a determination on whether or not a temporal change amount of a refrigerant discharge temperature of the compressor is equal to or larger than a preset first threshold value after the elapse of the preset time period and determining the occurrence of the frost formation on the outdoor heat exchanger when determining that the temporal change amount of the refrigerant discharge temperature of the compressor is equal to or larger than the preset first threshold value.

19. The air-conditioning apparatus of claim 17, wherein the two temperature measurement locations comprise one of a combination of a position of an inlet and a position of an outlet of the refrigerant passage and a combination of the position of the inlet of the refrigerant passage and an intermediate position between the inlet and the outlet.

20. The air-conditioning apparatus of claim 17, wherein the outdoor heat exchanger temperature difference determining unit changes the preset third threshold value in accordance with the number of the indoor units performing the heating operation.

* * * * *